Sept. 4, 1956   H. V. RUTKUS ET AL   2,761,677
METHOD AND APPARATUS FOR SEPARATING TISSUE PACKS
Filed Jan. 4, 1954   18 Sheets-Sheet 6

Fig. 6

Inventors:
Harold V. Rutkus and
Charles J. Greiner
By: Soans, Blaister & Anderson
Attys.

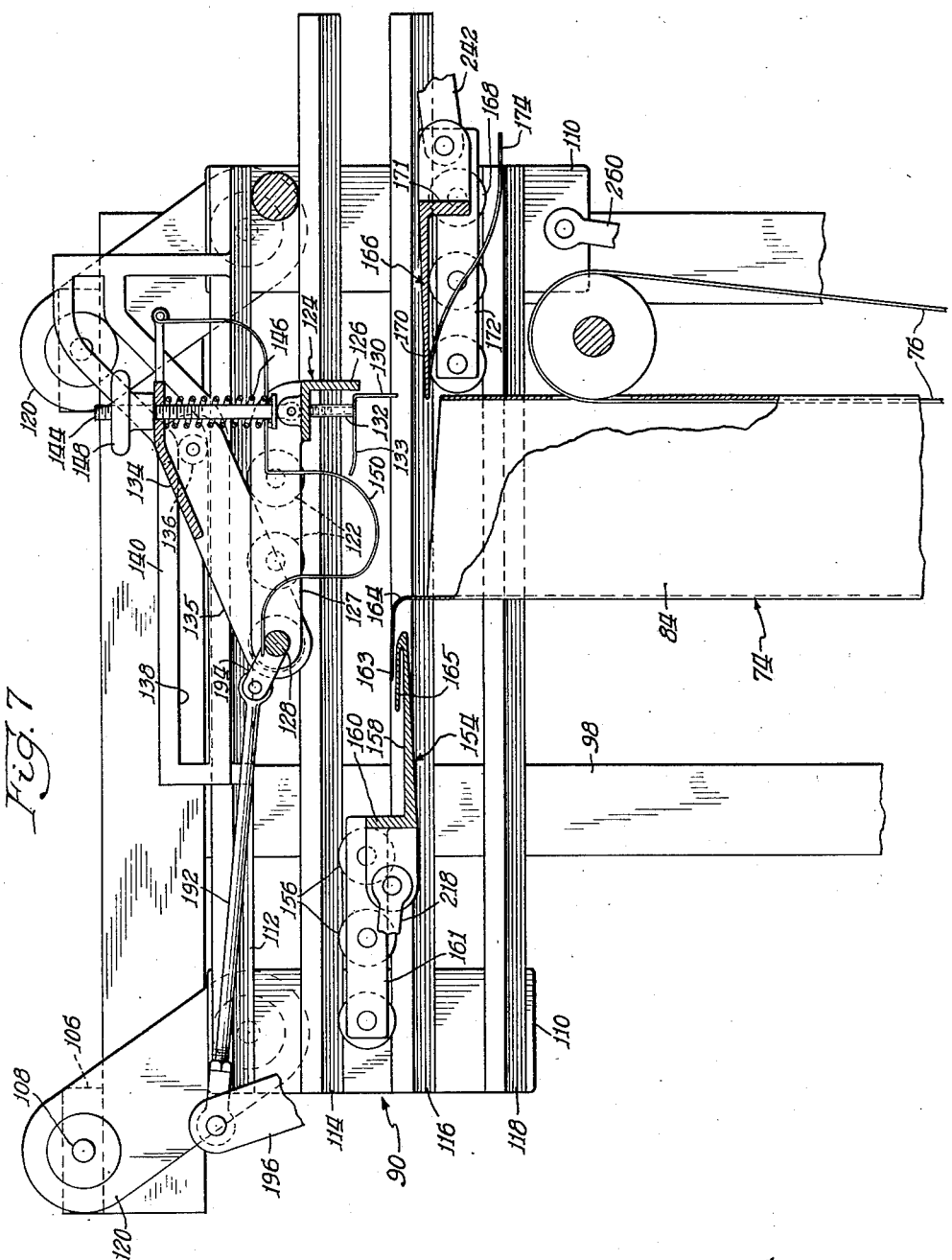

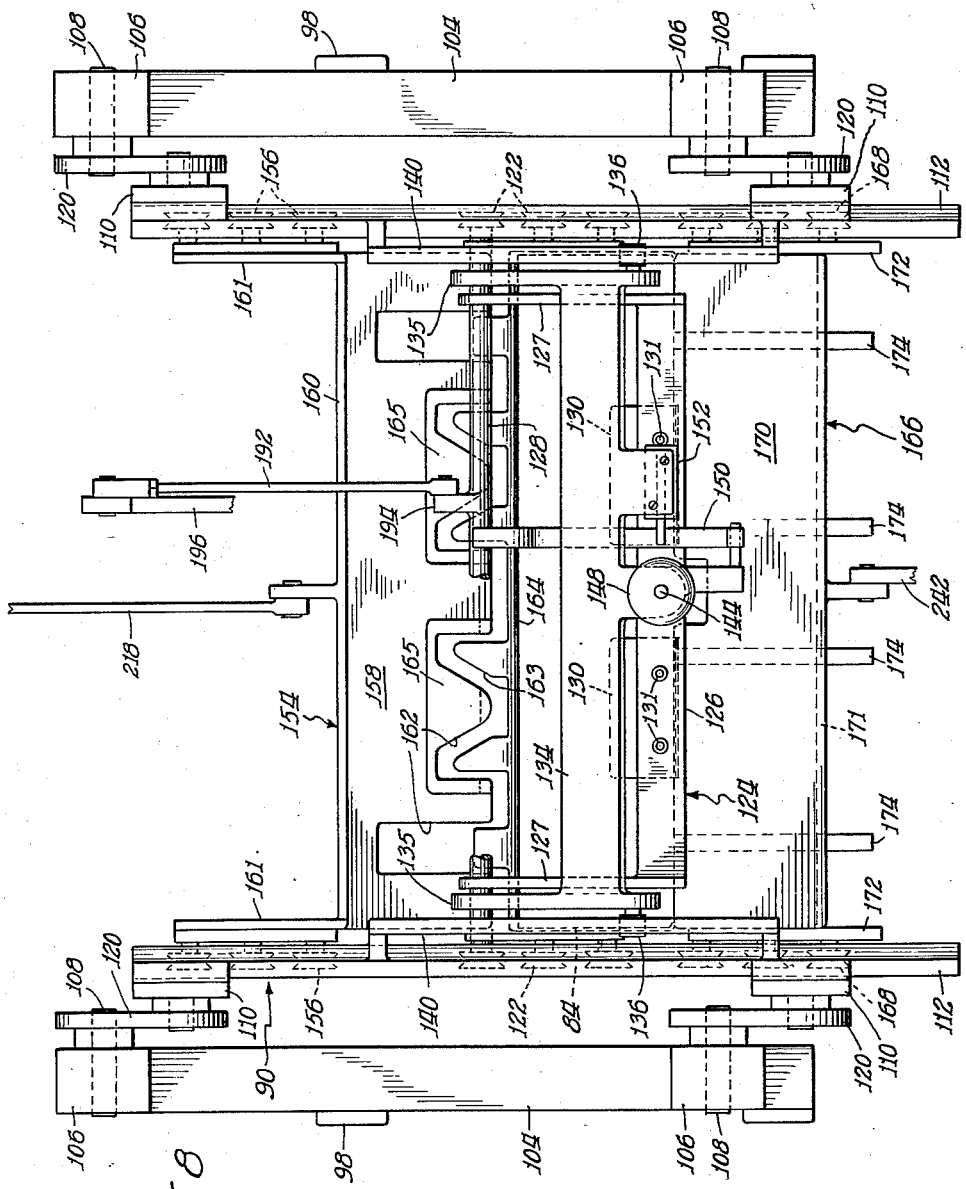

Sept. 4, 1956 H. V. RUTKUS ET AL 2,761,677
METHOD AND APPARATUS FOR SEPARATING TISSUE PACKS
Filed Jan. 4, 1954 18 Sheets-Sheet 9
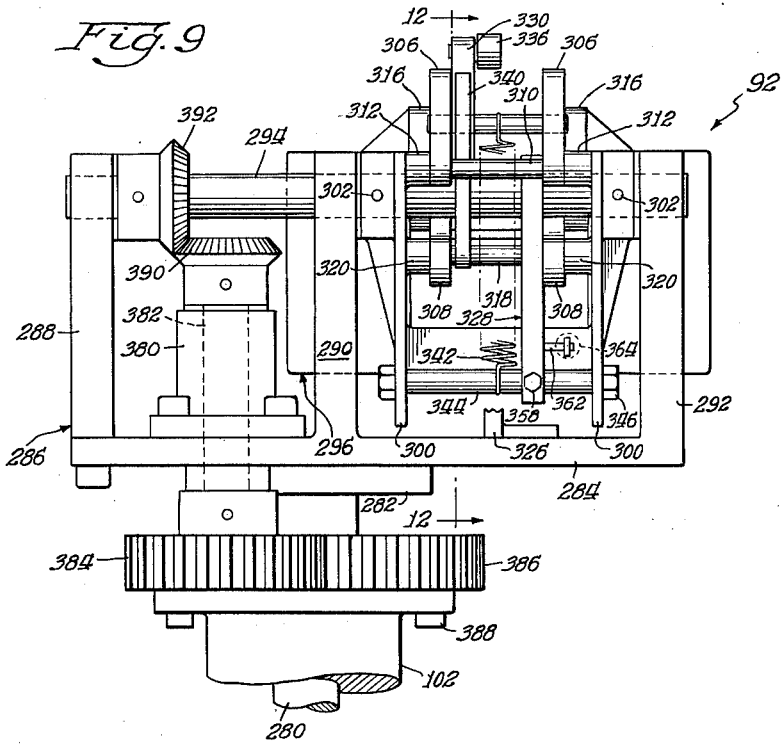
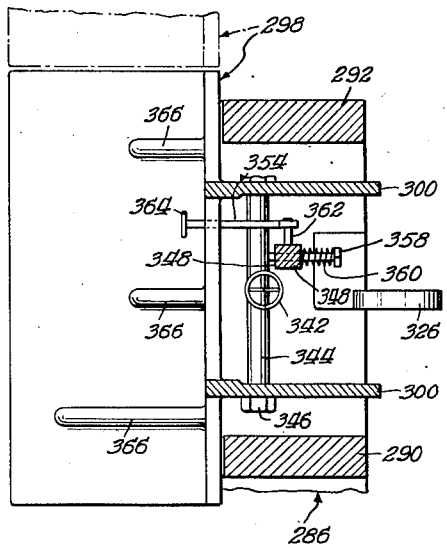
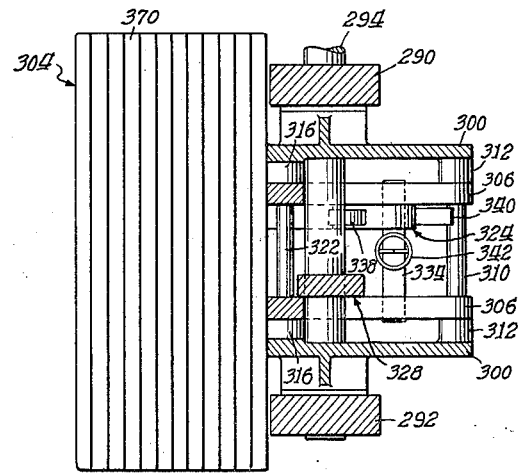
Inventors:
Harold V. Rutkus and
Charles J. Greiner
By: Soans, Blaister & Anderson
Attys.

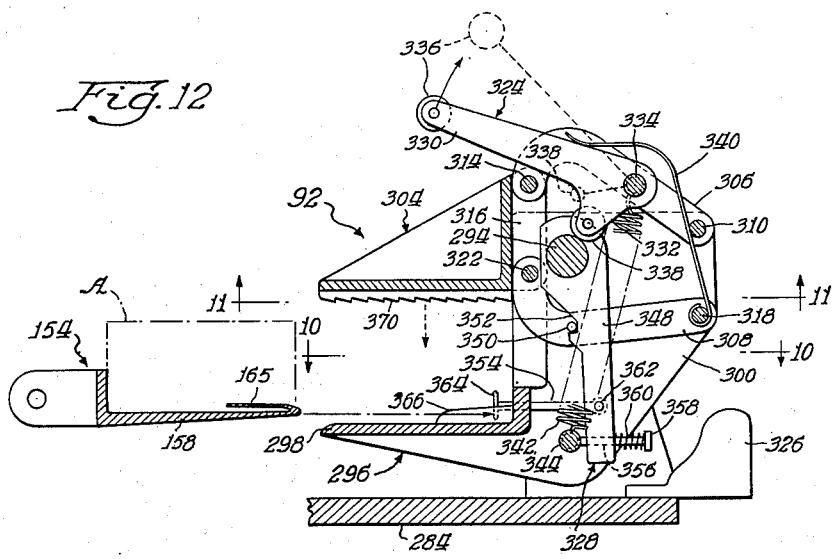
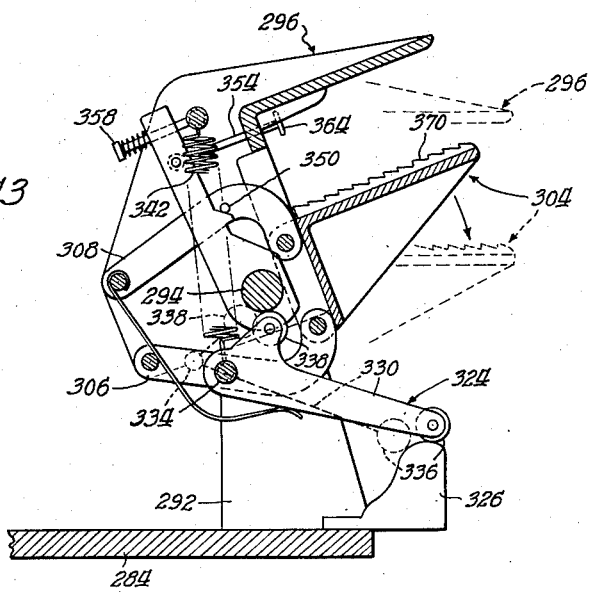

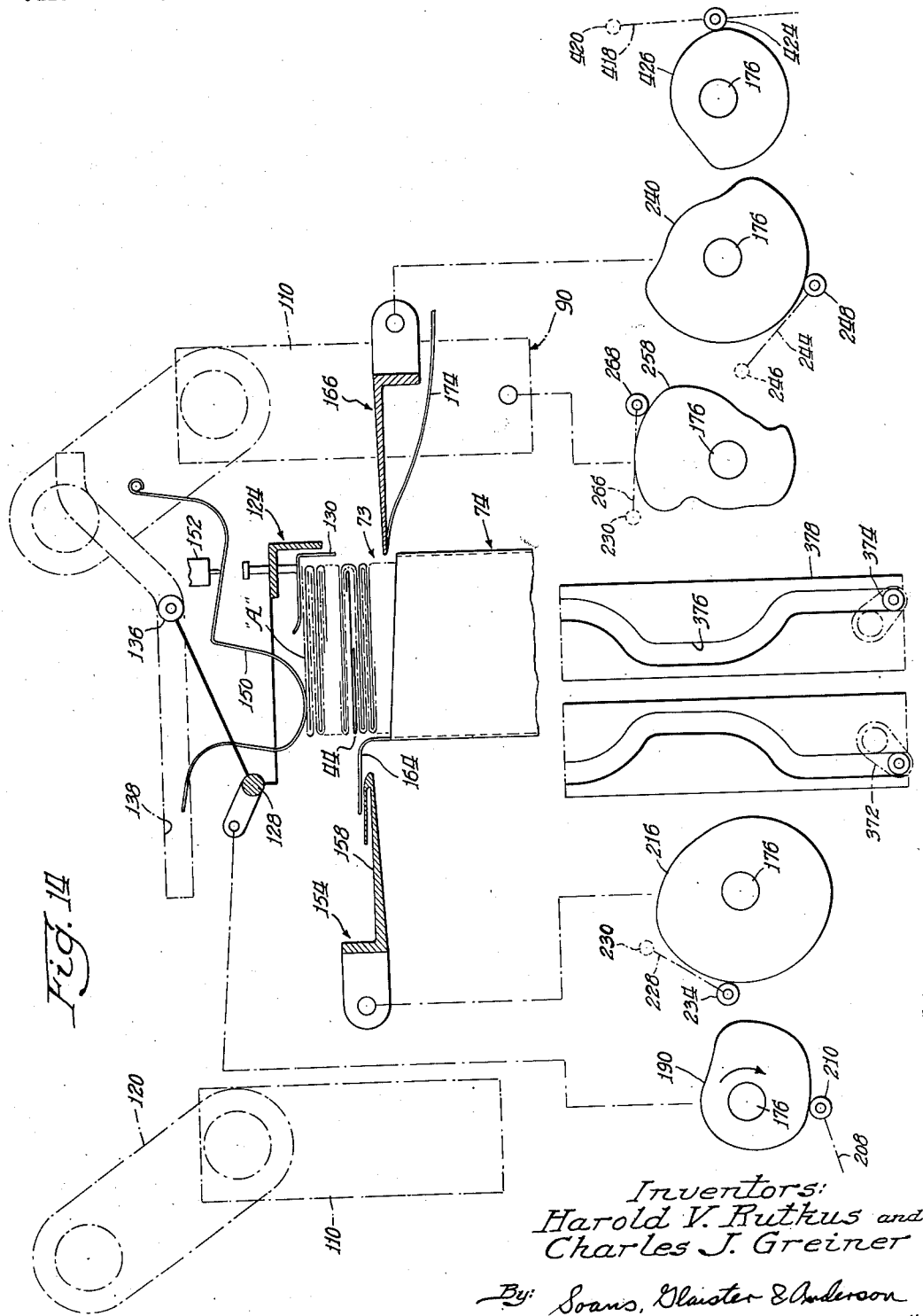

Sept. 4, 1956     H. V. RUTKUS ET AL     2,761,677
METHOD AND APPARATUS FOR SEPARATING TISSUE PACKS
Filed Jan. 4, 1954     18 Sheets-Sheet 12
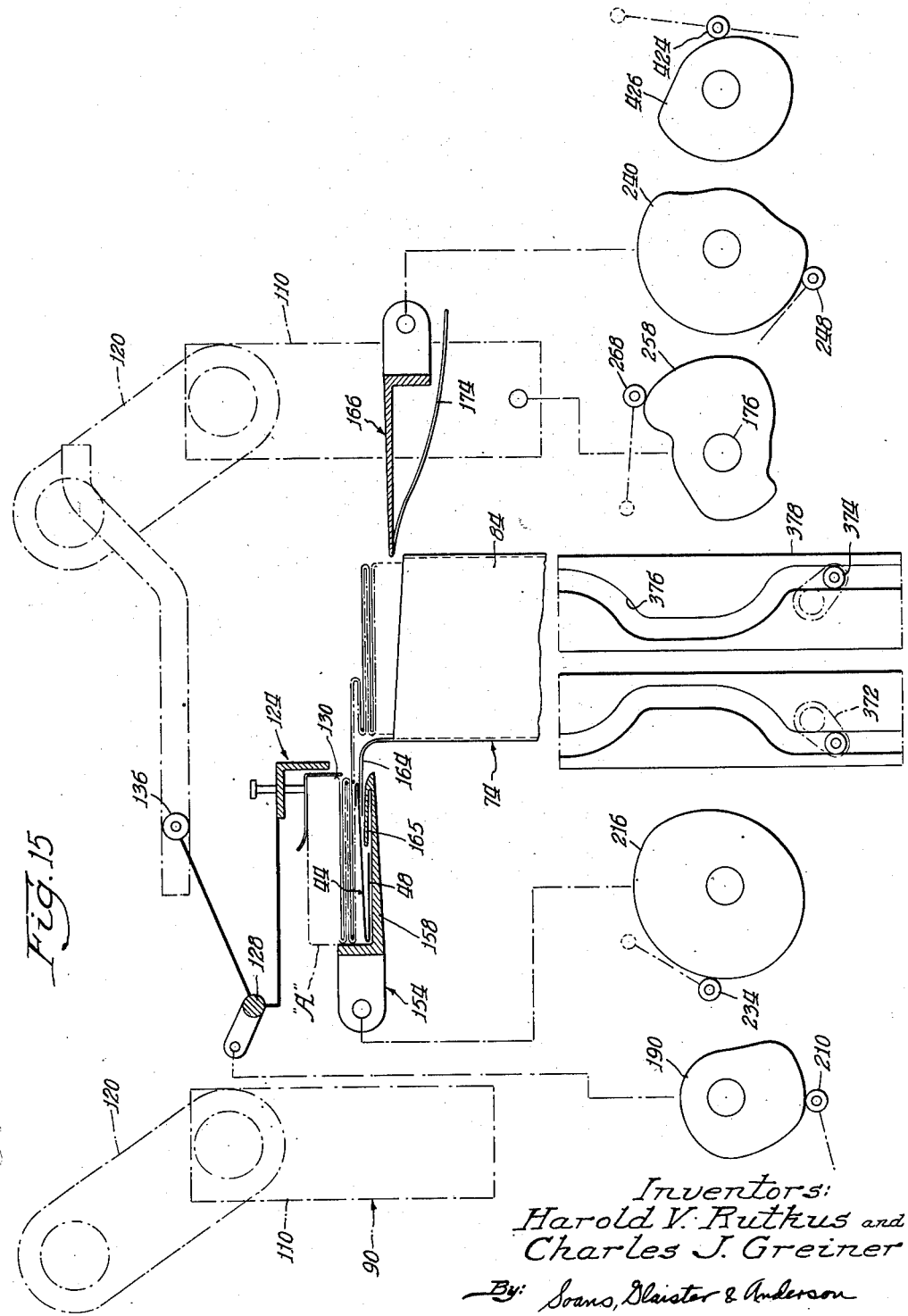
Inventors:
Harold V. Rutkus and
Charles J. Greiner
By: Soans, Glaister & Anderson
Attys.

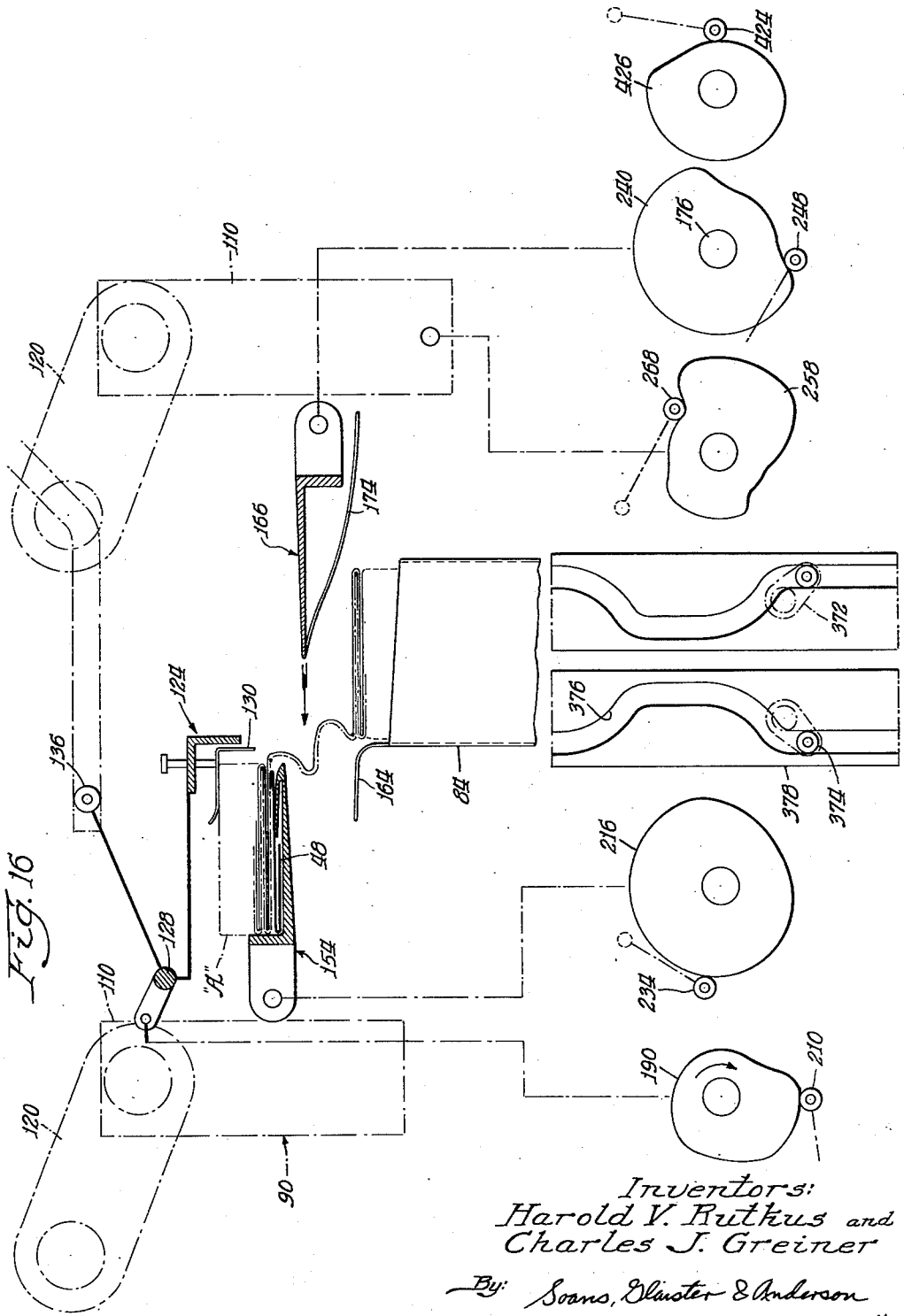

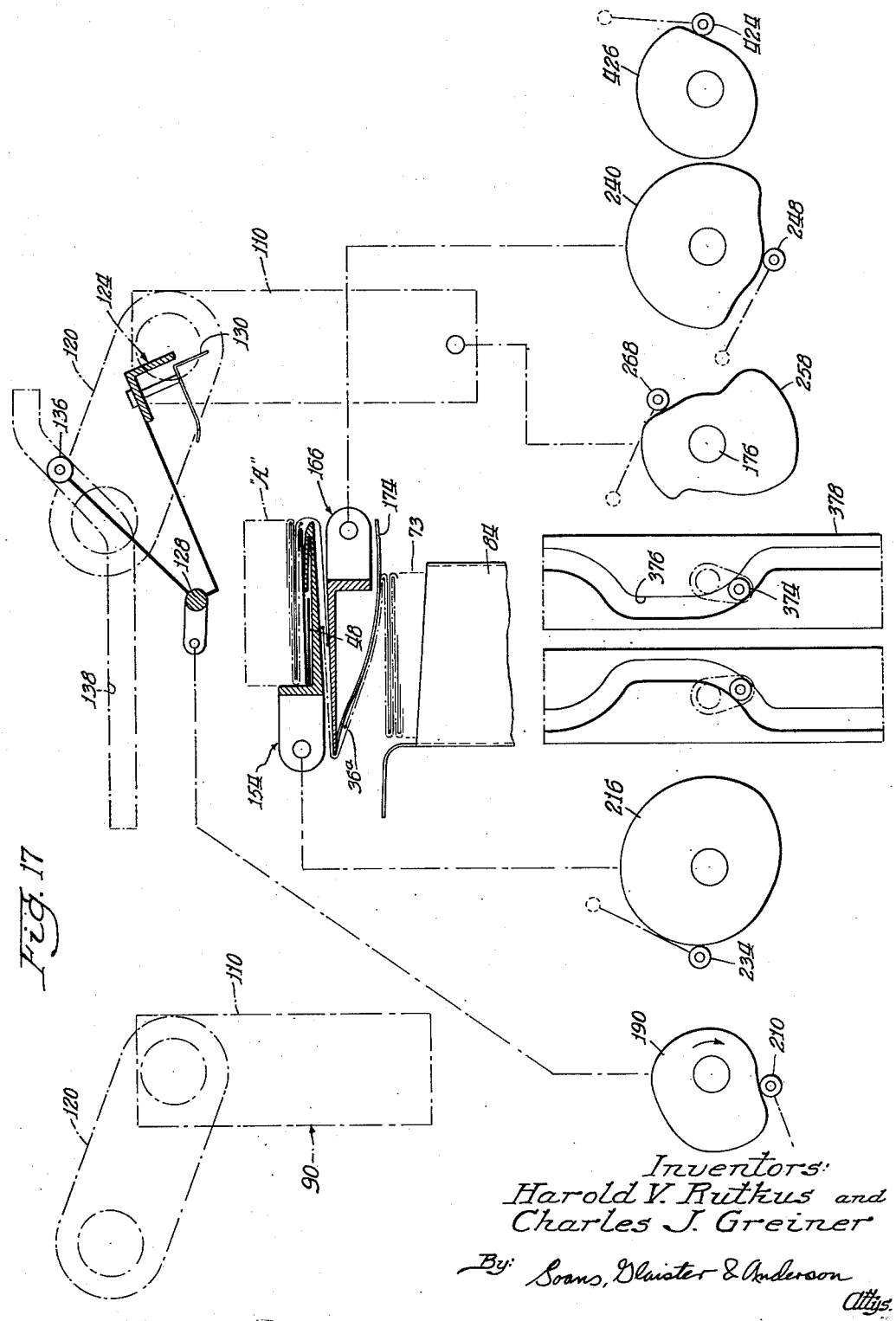

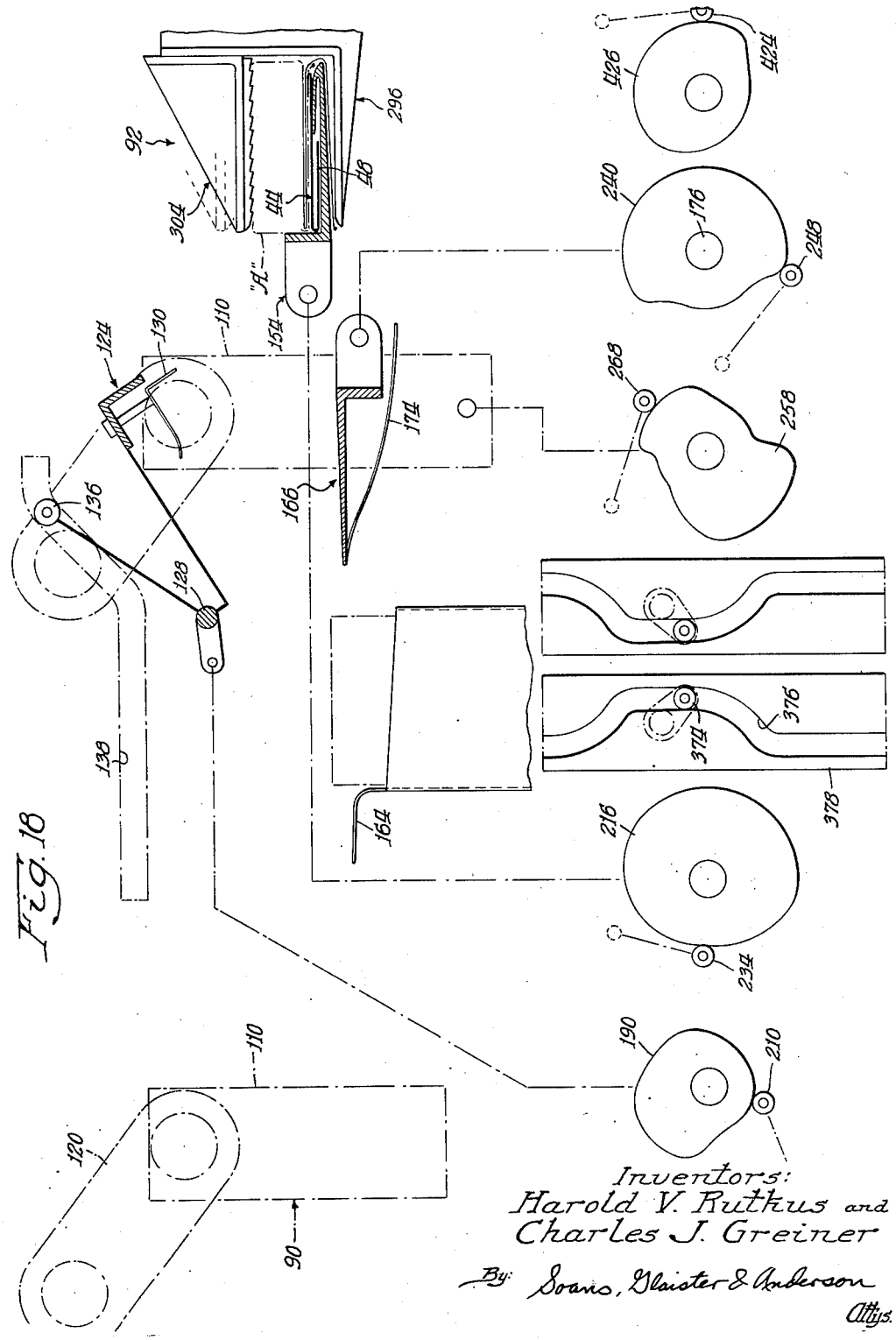

Sept. 4, 1956 H. V. RUTKUS ET AL 2,761,677
METHOD AND APPARATUS FOR SEPARATING TISSUE PACKS
Filed Jan. 4, 1954 18 Sheets-Sheet 16

Inventors:
Harold V. Rutkus and
Charles J. Greiner
By: Soans, Glaister & Anderson
Attys.

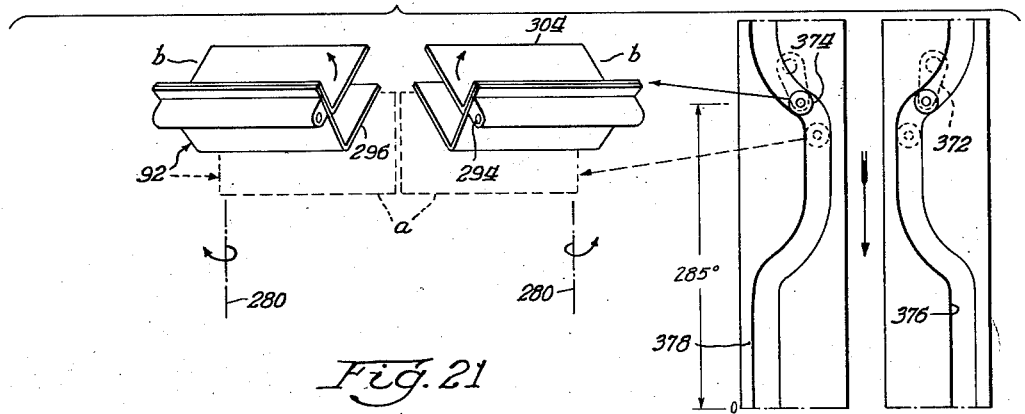
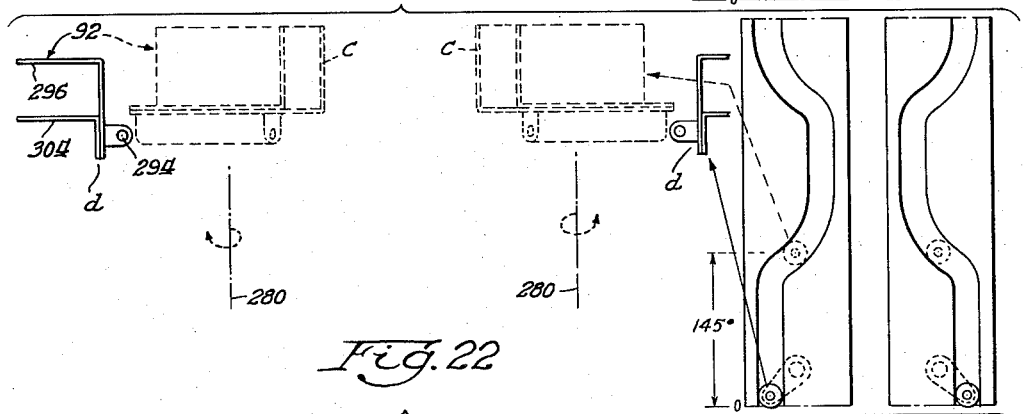
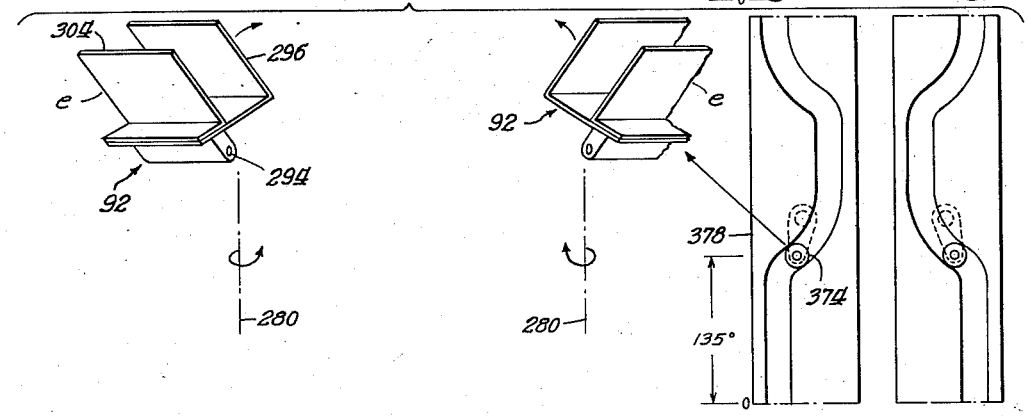

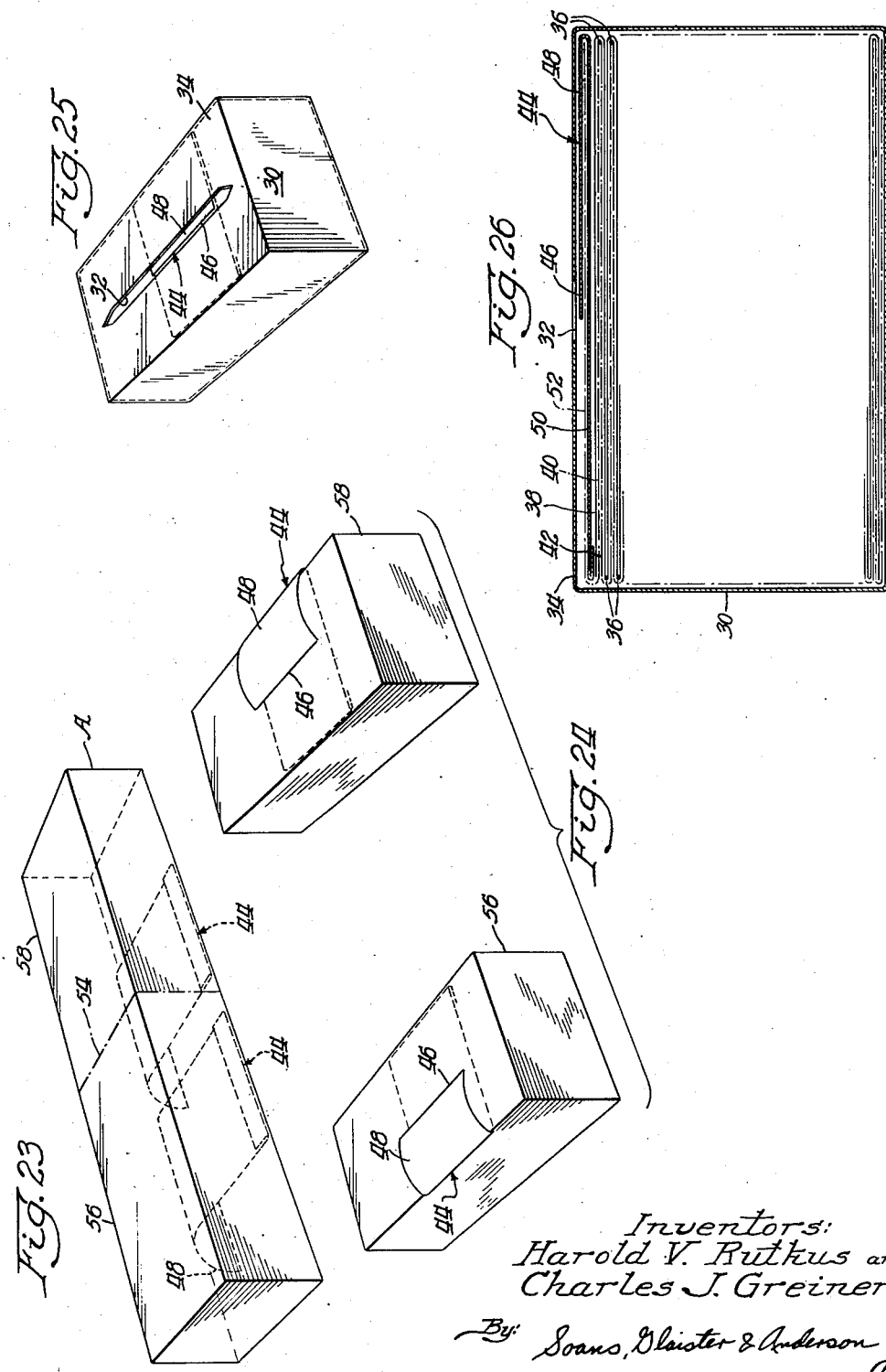

United States Patent Office 2,761,677
Patented Sept. 4, 1956

2,761,677

METHOD AND APPARATUS FOR SEPARATING TISSUE PACKS

Harold V. Rutkus, Neenah, and Charles J. Greiner, Menasha, Wis., assignors, by mesne assignments, to Kimberly-Clark Corporation, a corporation of Delaware Application January 4, 1954, Serial No. 401,942

15 Claims. (Cl. 270—39)

The present invention relates generally to the separation of portions of a stack of sheet material from the stack, and is more particularly directed to the automatic separation of a predetermined amount of paper from a continuously forming stack of such paper.

In the manufacture of paper sheets, wherein a stack of sheets is continuously being formed, there normally exists the problem of successively moving predetermined quantities of the sheets from the stack at a rate approaching the rate of formation of the stack. Obviously, as the rate of forming the stack increases the separation problem becomes more complex. The characteristics of the paper sheets being separated are also factors which may contribute to the difficulties experienced in attempting to achieve a satisfactory stack separation. For example, the size, weight and stiffness of the sheets determine to a large extent the method of handling, with the lighter weight, limp sheets being more difficult to separate than the heavier and stiffer sheets. The present invention is particularly concerned with the problem of separation of packs containing a predetermined quantity of limp, lightweight sheets, such as facial tissues, from a rapidly forming stack thereof.

The principal object of this invention is to provide a new and improved method and apparatus for automatically separating a predetermined quantity of sheets from a moving stack thereof. Other objects and advantages will become apparent as the disclosure progresses with reference to the accompanying 18 sheets of drawings, wherein:

Fig. 6 is a sectional view taken along the line 6—6 in Fig. 5, with certain of the parts shown in a different operating position and other elements omitted.

Fig. 7 is an enlarged sectional view of a portion of a pack separating mechanism, taken along the line 7—7 in Fig. 3, with parts omitted or broken away in the interest of clarity.

Fig. 8 is an enlarged fragmentary plan view of the pack separating mechanism, with portions broken away and omitted.

Fig. 9 is an enlarged fragmentary view of the structure in Fig. 2.

Fig. 10 is a section taken along line 10—10 in Fig. 12.

Fig. 11 is a section taken alonge line 11—11 in Fig. 12.

Fig. 12 is a sectional view taken along the line 12—12 in Fig. 9.

Fig. 13 is a view similar to Fig. 12, showing different positions of the breaker jaws.

Figs. 14–19 are diagrammatic showings of the relationship between the various elements of the separating mechanism and the operating cams therefor at several stages of the operation performed by the mechanism.

Figs. 20–22 are diagrammatic views of the breaker jaws in different operating positions, as related to the operating position of the cams which actuate the jaws.

Fig. 23 is a perspective view of the double pack before separation.

Fig. 24 is a perspective view of the separated portions of the pack in Fig. 23.

Fig. 25 is a perspective view of a package of tissues.

Fig. 26 is an enlarged cross section of a package of tissues.

Figure 1:
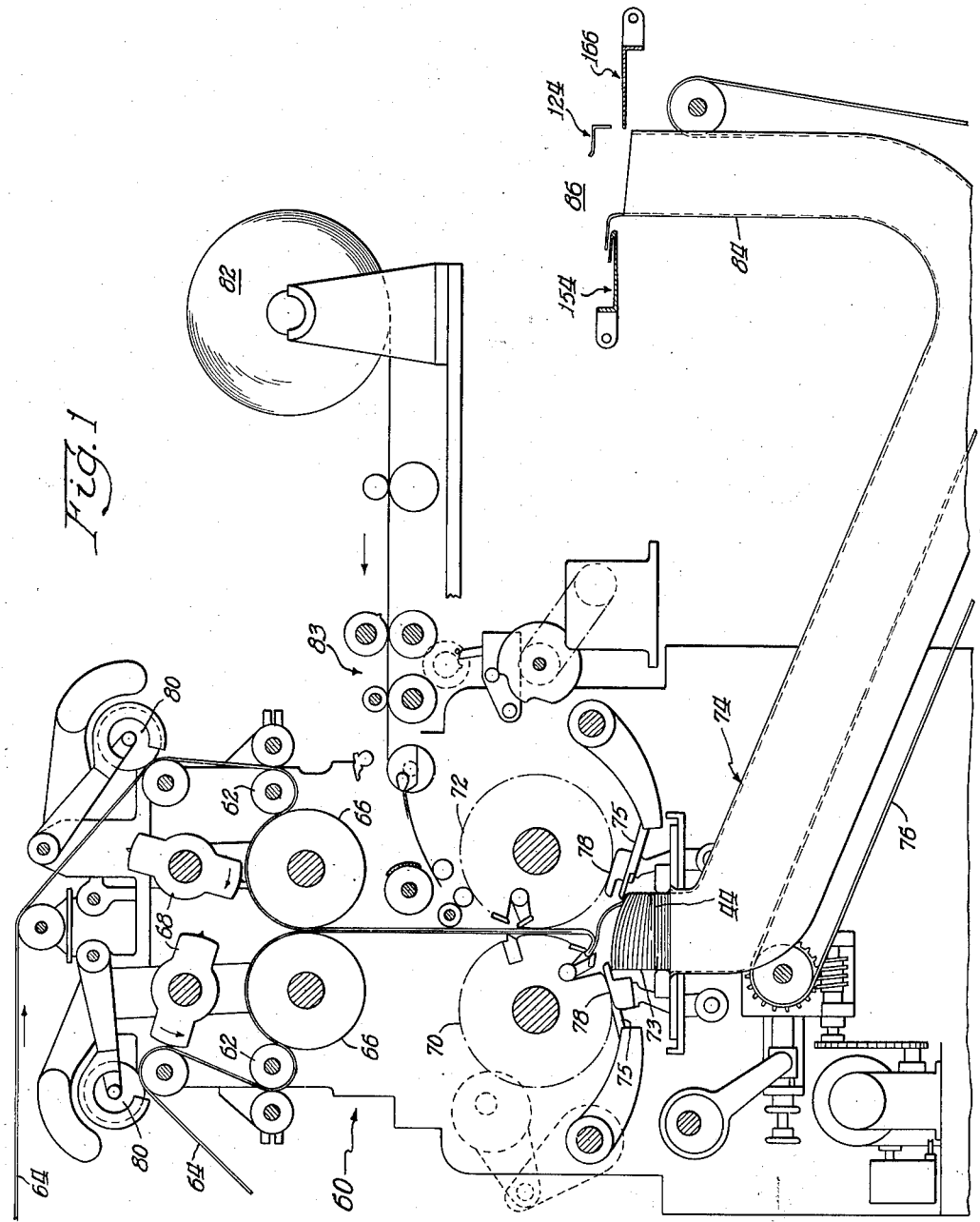
Fig. 1 is a diagrammatic showing of mechanism chosen to illustrate the present invention.

The objects of the invention may be more clearly understood by reference to Figures 23–26, illustrating an article of manufacture which might be produced by means including the present invention. The commercial package of tissues (Figs. 25 and 26) consists of a box 30 having a narrow slot 32 approximately the length of the box in the top wall 34 thereof. The interfolded tissues are diagrammatically represented by single lines within the box (Fig. 26) and these tissues are folded to provide overlapping folds of approximately equal width. The type of fold illustrated is generally referred to as an interfold. The free ends of the legs of tissues are disposed end to end and interconnected by small easily breakable bonds 36. The folded tissue 38 near the top of the box embraces the lower leg 40 of the next overlying tissue and the upper leg 42 of the next underlying tissue. The lower leg 40 is connected by the fold to the upper leg which is embraced within the uppermost folded tissue.

A pull out or starting sheet 44 is disposed at the top of the box and in interfolded relation to the adjacent tissues, with the free edge 46 of the upper fold 48 of the pull out sheet accessible within the area of the slot 32 in the top wall of the box. The overall width of the pull out sheet is preferably somewhat less than the length of the slot 32. The upper fold 48 and the main fold 50 of the pull out sheet embrace the upper leg 52 of the top tissue, in order that movement of the upper fold 48 of the pull out sheet 44 will be accompanied by a similar movement of the upper fold 52 of the top tissue with the latter being partially withdrawn through the slot 32.

The tissue sheets are preferably formed in continuous stacks having the pull out sheets 44 at predetermined intervals throughout the stack. Furthermore, the stack has a width which, in the illustrated instance, is twice the length of the commercial pack of tissues, and the stack is divided into two similar sections 56 and 58 by a line of readily breakable bonds 54 formed by incompletely slitting the tissue forming web longitudinally prior to the folding of the web.

The present invention is particularly concerned with the problem of effectively separating the double packs of tissue sheets from the stack at the plane of the starter or pull out sheets 44. As illustrated in the accompanying drawings each of the two sections of the double pack include a pull out sheet. It will be understood however that if such sheets are desired only for the purpose of separating the pack from the stack, one sheet may suffice.

For the purpose of simplifying the present description, it will be considered that the separating mechanism 86 is disposed at the forward side of the interfolder 60 and that the forward end of the separating mechanism is, therefore, the end farthest from the interfolding machine.

With reference particularly to Figure 1, it is seen that the apparatus chosen to illustrate the present invention is a rotary interfolding machine 60 of the type disclosed in the Sabee et al. application, Serial No. 308,996, filed September 11, 1952. Included in this machine are a series of guide rolls 62 for guiding a pair of webs 64 so as to cause them to pass over a pair of anvil rolls 66, Rotary knives or knife carriers cooperate respectively with the anvil rolls 66 to slit the webs 64 transversely, preferably in such a manner as to preserve slit bonds at the lines of the transverse cuts so as to maintain continuity of the web for passage between a pair of cooperating interfolding rolls 70 and 72. These interfolding rolls effect alternate opposite folding of the two webs 64, and the depositing of the folded web in a stack 73 which is suitably guided for movement through the guide chute 74. The guide chute includes a conveyor belt 76, which is suitably controlled to advance the stack at the rate required to maintain the top of the stack in substantially constant relationship to the interfolding rolls 70 and 72. Suitable packers 75 operate on opposite sides of the stack 73 together with suitable hold down devices 78 to hold the top of the stack down in predetermined relationship to the interfolding rolls.

As indicated above, in the illustrated instance there is employed tissue webs of twice the width of the desired tissue package, these webs being suitably slitted longitudinally by slitter wheels or disks 80. As the tissues enter the interfolding apparatus the slit thus formed is substantially complete, but leaves sufficient bond to hold the web portions on opposite sides of the slit in edge to edge relation for passage through the interfolding apparatus as a unit.

The starter sheets 44 are supplied from rolls of suitable paper strips 82, which may be printed with any desired notice or data. It is preferable that the starter sheets be formed of calendered paper, in order to provide a smooth stiffened insert sheet which will carry the top tissue with it when it is withdrawn from the package, and which will readily afford separation of the individual packs from the stack 73 in the manner of the present invention. The strips of paper from the rolls 82 are fed through suitable mechanism, indicated generally at 83 which serves to cut the strips into sheet units and to fold the units into the desired form. The folded starter sheets are then automatically fed into the interfolded mechanism, at predetermined intervals regulated by the latter, so as to properly position the sheets in the stack of tissues.

The starter sheets 44 are fed into the interfolding mechanism somewhat closer to the line of severance 54 (Fig. 23) in the tissue webs than to the outer edges thereof, but may be located elsewhere along the stack. However, it has been found that the use of starter sheets having a width less than the separable tissue packs and the disposition of these sheets in off-center relation to the tissue packs does not hamper the proper separation of the packs or the function of the sheets as a device for pulling the first tissue from the package. As will be more fully appreciated as the disclosure progresses, the utility of the sheets 44 as an aid to separation of the packs is independent of the function of each of these sheets as a starter or tissue pull-out sheet. Accordingly, in some instances the latter function may not be required, and the sheets 44 may be discarded once they have fulfilled their purpose in aiding the pack separation.

Figure 2:
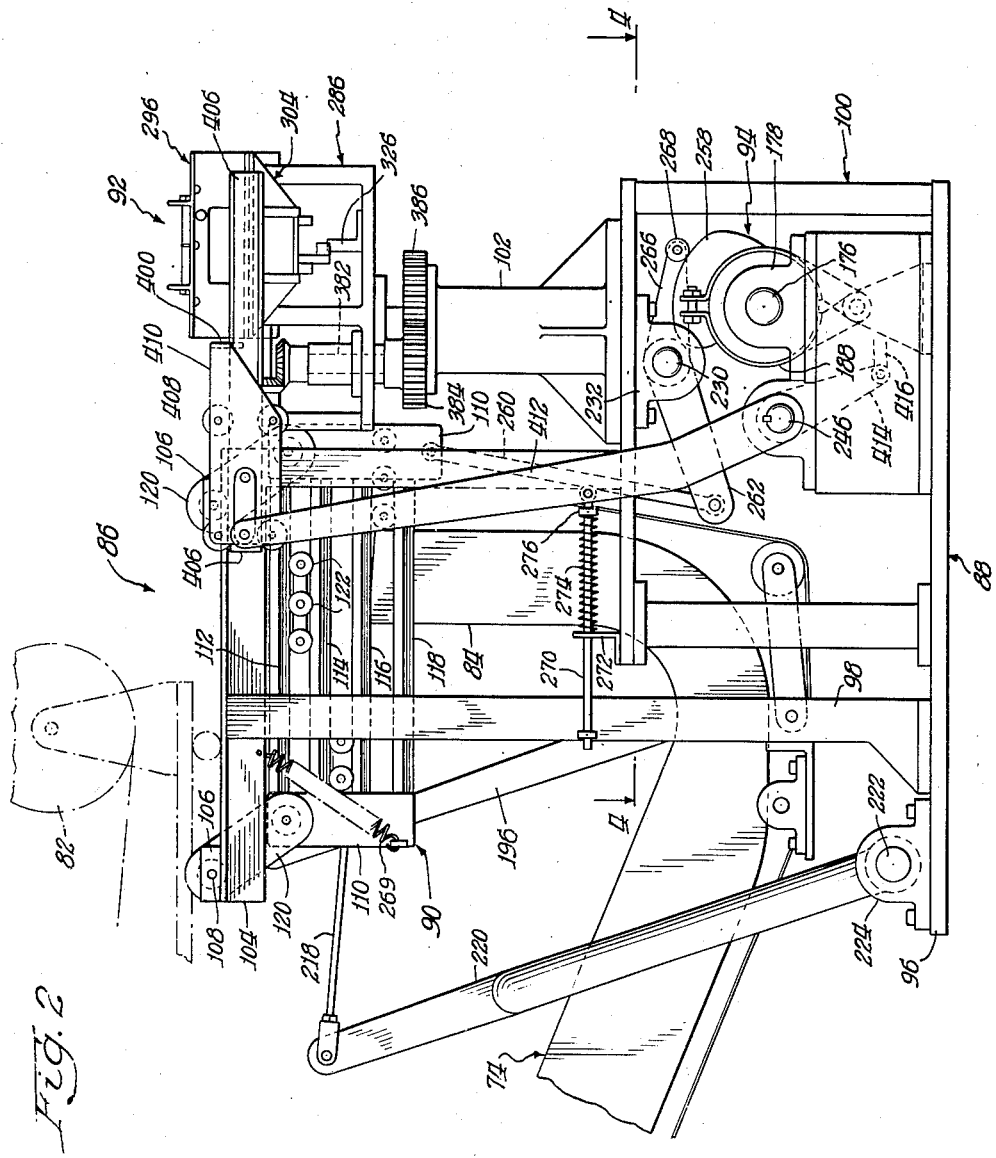
Fig. 2 is a side view of the pack separating mechanism which is shown diagrammatically in Fig. 1.

As seen particularly in Figs. 2 and 6, the end of the guide chute 74 terminates in a vertical section 84 to thereby direct the moving stacking of tissues upwardly. A stack separating mechanism 86 is disposed adjacent the terminal end of the chute 74 in position for removal of the packs from the stack as they reach the end of the chute. This stack separating mechanism comprises generally a frame structure 88 (Fig. 2), a movable carriage structure 90 supported on the frame structure adjacent the upper end of the stack, a pair of carriers or breaker jaws 92, and the drive mechanism 94 for operating the relatively movable parts of the separating mechanism.

The frame structure 88 for supporting the separating mechanism comprises a base 96, a pair of vertically extending, posts 98, a sub-frame assembly 100 supported on the base and providing a housing for the drive mechanism, a pair of cylindrical upright members 102 fixed to the top of the subframe, and a pair of side members 104 supported on the upper ends of the posts 98 and the upright members 102. As noted in Fig. 2, the side frame members 104 also provide a support for the structure mounting the rolls of paper 82 from which the starter sheets 44 are cut.

Each of the side frame members 104 includes a pair of longitudinally spaced bearing means 106 (Figs. 3 and 7) mounting a stub shaft 108, thereby defining four corner supports for the generally rectangular carriage structure 90. More particularly the carriage 90 (Fig. 2) includes a vertical member 110 at each of its four corners, and the upper end of each of these members 110 is pivotally connected by a link 120, with the associated one of the stub shafts 108. Thus vertical swinging movement relative to the main frame 88 is provided for the carriage 90.

Opposite sides of the carriage 90 include a series of four vertically spaced, parallel guide bars 112, 114, 116 and 118, respectively. These bars are diamond shaped in cross-section to thereby define a vertical series of three tracks for guidedly supporting grooved pulleys or rollers. The three tracks thus formed are used to support and guide the movement of three movable parts of the pack separating mechanism, namely, a pusher mechanism 124 (Fig. 7), a transfer plate 154 and a bond-breaking separator plate 166.

The pusher mechanism 124 is supported on the tracks formed by the two pairs of upper bars 112 and 114 for guided movement therealong, by means of a roller assembly 122 including a series of interconnected rollers. The pusher 124 (Fig. 8) includes a transverse angle member 126 which has fixed at opposite ends thereof, as by welding, a pair of arms 127. The arms 127 extend in the direction of the chute 74 and are rotatably mounted on a cross shaft 128 which carries a pair of the rollers 122. The angle member 126 has a pair of pusher elements 130 fixed thereto in depending relation, as by the screws 131 (Figs. 7 and 8) which extend through opening in the angle member 126 into internally threaded tubes 132 fixed to the elements 130. The pusher elements 130 are preferably a flexible, lightweight metal plate which is bent at 90 degrees to generally conform with the shape of one edge of the tissue stack.

The pusher mechanism 124 also includes a relatively adjustable, upper assembly comprising a transverse frame member 134 (Fig. 7) disposed in overlying relation to the angle member 126 (Fig. 8) and including a pair of arms 135 which are pivotally mounted at one end of the cross shaft 128. The other end of the arms 135 includes a laterally extending roller 136 disposed for engagement with a track 138 formed on top of the side frame member 104 (Fig. 8). The track 138 is provided by a pair of vertically spaced members 140 which extend horizontally for a portion of their length and then curve upwardly to provide an inclined track section.

The upper frame member 134 adjustably supports the angle member 126 to prevent swinging movement of the latter about the cross shaft 128. More specifically, a threaded rod 144 (Fig. 7) is pivotally connected to the lower member 126 and extends upwardly therefrom through an opening in the upper member 134. An internally threaded knob 148 is positioned on the upper end of the rod 144 to secure the two transverse pusher members in vertically spaced relation. Upward movement of the lower member 126, relative to the upper member 134, is yieldingly resisted by a coil spring 146. The upper transverse member 134 has also attached thereto a downwardly extending, curved spring element 150 disposed for engagement with the upper surface of the stack 73 in the chute 74. This spring 150 operates a microswitch 152 (see also Fig. 12) which controls the drive mechanism for the entire pack-separating mechanism 86, as will be explained hereinafter.

The transfer plate structure 154 (Figs. 7 and 8) is movably supported on the carriage 90 by a series of rollers 156 which are disposed in the center track formed by the guide bars 114 and 116. Specifically, the transfer plate comprises a generally horizontal plate 158 positionable in closely adjacent relation to the upper end of the chute 74 to receive a pack of tissues as the latter are moved across the chute by the pusher elements 130. The plate 158 includes a vertically extending flange 160 along its rear section, which has a pair of side arms 161 fixed at opposite ends thereof in rearwardly extending relation. Each of the side arms 161 mount a series of the rollers 156 for guided support by the carriage bars 114 and 116.

As noted particularly in Fig. 8, the leading edge of the transfer plate 158, includes a series of cut out portions 162 which are adapted to mate with complementary projecting portions 163 of a laterally extending lip 164 on the adjacent side of the chute 74. It will further be noted that the leading edge of the transfer plate 158 has a pair of overlying sections 165 which extend rearwardly from the forward edge of the plate (Fig. 7). The purpose of this latter construction will be explained later in the description of the operation of the pack separating mechanism.

The separator plate structure 166 (Figs. 7 and 8), for breaking the bond between the stack and the pack being separated therefrom, is supported on the carriage 90 by a series of rollers 168 carried by the lower pairs of guide bars 116 and 118 on the carriage. The plate structure 166 comprises a relatively thin, horizontal plate 170 having a depending flange 171 (Fig. 7) across its forward edge, and a pair of side members 172 fixed to the flange at opposite ends thereof. The side members 172 have the rollers 168 rotatably mounted thereon in generally coplanar relation for supported engagement with the guide bars 116 and 118.

As seen in Fig. 7, the plate 170 is disposed for movement across the upper end of the chute 74, and this plate includes a plurality of depending flat spring members 174 for exerting pressure on the underlying tissue stack as the knife-like plate 170 moves to break the bond between the upper sheet in the stack and the lower sheet in the pack being removed.

It is seen from the foregoing, therefore, that relative movement between the carriage 90 (Figs. 2 and 7) and the main frame 88 is provided by the swingable arms 120, and that the pusher mechanism 124, the transfer plate 154 and the separator plate 166 are movable relative to the carriage 90. The various relative movements thus afforded are controllably effected through a drive means indicated generally by the reference numeral 94 (Figs. 2, 4, 5 and 6).

The drive means 94 (Fig. 3) comprises generally a motor 180, a main cam shaft 176, and a power transmitting means between the motor and the cam shaft including a gear box 182 and a chain drive 184. The opposite end portions of the cam shaft 176 are journalled in suitable bearings 178 which are supported in elevated relation to the base 96 of the main frame 88. Also disposed at one end of the cam shaft is a single revolution clutch 186 (Fig. 5) which is electrically operated through means including the control switch 152 mounted on the pusher mechanism 124. The other end of the shaft 176 includes a brake mechanism 188 for preventing overrunning of the shaft due to the momentum of the rotating cams.

The pusher mechanism 124 is driven from a cam 190 (Fig. 5) fixed on the cam shaft 176 at a central portion therealong. A driving connection between the pusher and the cam is established through means which includes an adjustable link 192 (Fig. 7) pivotally interconnecting an arm 194 on the pusher cross shaft 128 and the upper end of a lever 196. The lever 196 is in the form of a bell crank and is pivotally mounted on one of the frame posts 98 by a stud shaft 198. The free end of the lower arm of the lever 196 is in turn pivotally connected with an underlying lever arm 200, by means of a rod 202 (Fig. 6). As noted particularly in Fig. 4, the lever arm 200 is fixed to one end of a transverse shaft 204 for rotation therewith as provided by a pair of bearing supports 206.

The other end of the shaft 204 has fixed thereto a forwardly extending arm 208, which carries a cam follower 210 at its free end portion in position for engagement with the pusher cam 190. Constant engagement between the cam and the follower 210 is provided for by the spring 212 (Fig. 6), which is disposed between the lower arm of lever 196 and a bracket 214 on the frame to thereby urge the rod 202 downwardly to move the follower 210 upwardly into engagement with the cam 190. It is seen, therefore, that rotation of the pusher cam 190 is effective to produce movement of the pusher mechanism 124 longitudinally of the supporting carriage 90.

Figure 5:
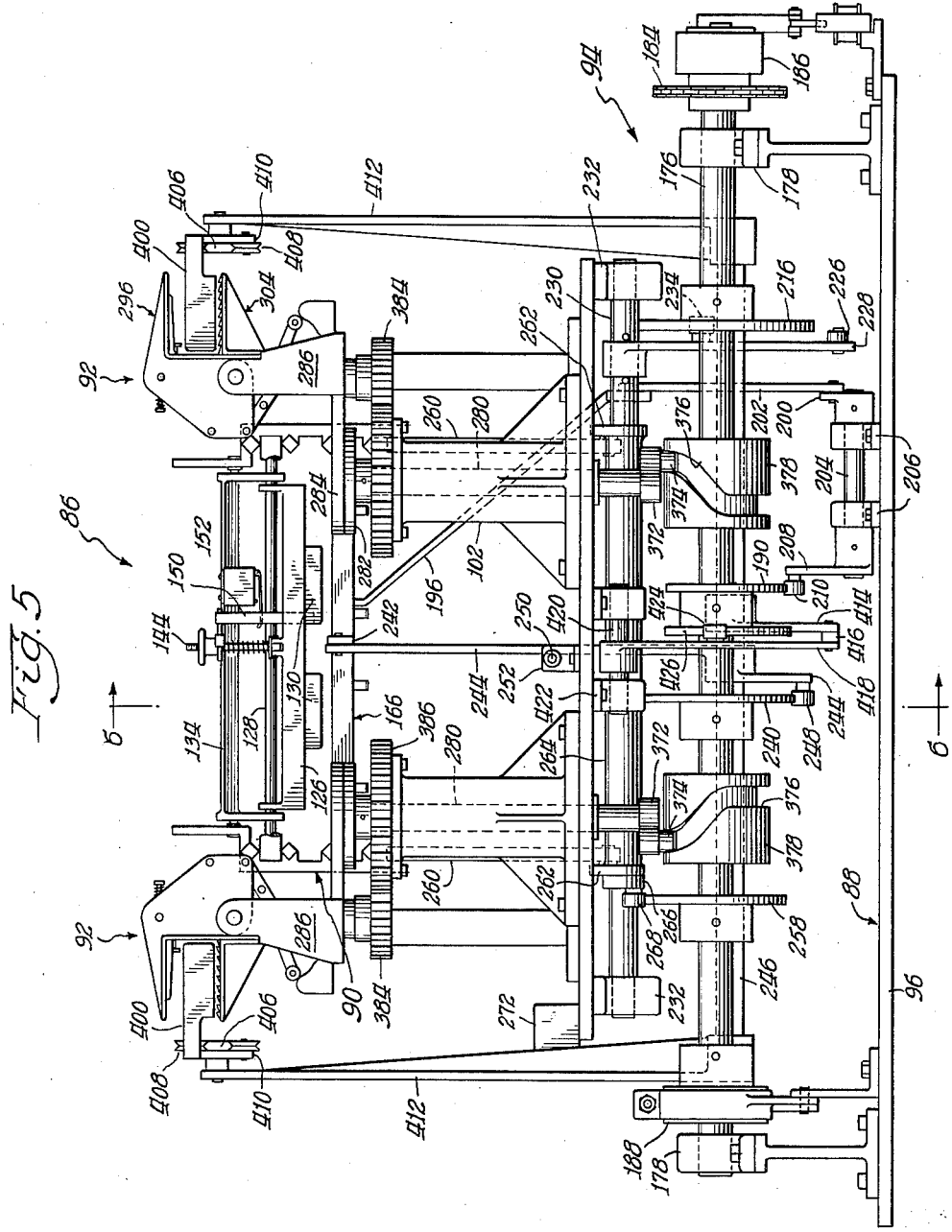
Fig. 5 is an end view of the pack separating mechanism, taken from the right side in Fig. 2.

A larger cam 216 at the right end portion of the shaft 176 (Fig. 5) transmits motion to the transfer plate structure 154. The transfer plate is pivotally connected by an adjustable rod 218 (Fig. 6) with the upper end of a bifurcated lever 220, which has its downwardly extending leg portions rotatably mounted on a cross shaft 222 supported by a pair of bearings 224. The lower end portion of one of the spaced-apart legs of the lever 220 has a forwardly extending link 226 pivotally connected thereto. The forward end of the link 226 is in turn pivotally connected to the lower end of a lever 228 which is rotatably mounted at its upper end on a transverse shaft 230 supported on an overlying portion of the sub-frame 100 by a pair of bearing structures 232 (Fig. 5). The lever 228 has a cam follower 234 rotatably mounted at an intermediate portion therealong in position for engagement with the transfer plate cam 216. The follower 234 is maintained in position against the cam 216 by means of a compression spring 236, which is disposed around a rod 238 in a biasing position between the lower end of the lever 228 and the frame post 98.

The separator plate 166 is driven from a cam 240 (Figs. 5 and 6) which is fixed to the shaft 176 at approximately the center thereof (Fig. 5). The separator plate is pivotally connected, through a link 242 (Fig. 6), with the upper end of a bell-crank lever 244, which is mounted intermediate its ends on a cross shaft 246 disposed to the rear of the main cam shaft 176. The lower end of the bell-crank 244 has rotatably mounted thereon a cam follower 248 which engages the cam 240. A biasing means is provided to maintain contact between the follower and the cam, including a rod 250 (Fig. 6) which is pivotally connected with the upper arm of the lever 244, a bracket 252 slidably receiving the free end of the rod 250, and a spring 254 interposed between the bracket 252 and a fixed seat 256 on the rod 250.

Also mounted on the cam shaft 176, at the left end portion as seen in Fig. 5, is a cam 258 for controlling the swinging movement of the carriage 90 afforded by the supporting arms 120 mentioned above. With particular reference to Figs. 2 and 5, it is seen that each of the forward end members 110 of the carriage 90 has a downwardly extending rod 260 pivotally connected thereto. The lower end of the rods 260 are in turn pivotally connected with the free end portion of a pair of arms 262, which are fixed to an elongated, cylindrical sleeve 264 rotatably mounted on the cross shaft 230.

The sleeve 264 also has fixed thereto, at the left end in Fig. 5, a forwardly extending arm 266 which rotatably mounts a follower 268 in position for engagement with the carriage cam 258. This position of engagement is maintained by means of a pair of springs 268 (Fig. 2) which are disposed between the carriage 90 and the upper, side frame members 104 in position to bias the entire carriage to the right as seen in the drawings. This action of the springs 269 urges the rod 260 upwardly and to the right to thereby bias arms 262 and 266 in a clockwise direction about the shaft 230 and force the cam follower 268 to maintain engagement with the cam 258. Consequently, the rotation of the cam 258 will effect a vertical movement of the rods 260 which will be translated into a swinging movement of the carriage 90 about the axis of the supporting stub shafts 108.

The pack separating machine 86 also includes the pair of carriers or breaker jaws 92 for receiving the separated pack and conveying the two separable portions thereof to a predetermined position for removal to a packaging mechanism or the like (not shown). The breaker jaw mechanism per se is the subject of our co-pending application Serial No. 401,774, filed January 4, 1954, which also discloses the structure described herein.

Looking at Figs. 2, 3, 5 and 6, it is seen that the carriers are supported on the sub-frame 100 at the forward end of the carriage 90, and these carriers are movable from the position shown to a position indicated in Fig. 18 to receive the separated pack from the transfer plate 154. As will be pointed out in detail, the movement of the carriage 92 to the position seen in Fig. 2 is effective to break the double pack of tissues and position the separated pack portions for movement to a packaging apparatus or the like.

The support means for each of the breaker jaws 92 comprises a cylindrical upright member 102 which is fixed to the top of the sub-frame 100. A vertical shaft 280 (Fig. 5) extends upwardly through a center opening in the cylindrical member 102 and this shaft is rotatable within the latter member. The upper end of the shaft 280 has fixed thereto a circular plate 282 to which is secured a larger plate 284 forming the base of a mounting frame 286 for the breaker jaw.

Looking particularly at Fig. 9, it is seen that the jaw-supporting frame 286 includes three spaced-apart vertical members 288, 290 and 292 which have aligned openings at their upper end portions, to thereby provide a bearing support means for a rotatable shaft 294 which provides a horizontal pivot mounting for the breaker jaw. The lower portion 296 of the breaker jaw 92, as seen in Fig. 9, comprises a right-angle forming structure with one flange 298 (Fig. 12) forming the bottom part of the jaw 92 when the latter is in its pack-receiving position. The lower jaw portion 296 includes a pair of integrally formed webs 300 which extend vertically to the rear of the flange 298. The webs 300 have a pair of aligned openings (not shown) at their upper ends for mounting the jaw portion 296 on the shaft 294 in fixed relation thereto, as by a pair of pins 302.

An upper portion 304 of the breaker jaw is supported on the webs 300 for relative movement by means of two pairs of links 306 and 308. The upper pair of links 306 are pivotally mounted at one end on a pin 310 carried on the webs 300 by aligned bearings 312 formed on the latter. The others ends of the links 306 are pivotally connected with another pin 314 which extends between a pair of short flange portions 316 extending outwardly from the back of the upper jaw portion 304.

The lower pair of links 308 are pivotally mounted at one end on a pin 318 disposed below and parallel to the pin 310 which carries the upper links 306. A pair of bearing bosses 320 on the webs 300, similar to the bearing elements 312, provide a support for the pin 318. The links 308 extend forwardly to a pivotal connection with a pin 322 carried by the flanges 316 in a position below and parallel to the upper pivot pin 314 (Fig. 12).

Thus it is seen that the pivot axes for the links 306 and 308 are disposed at the four corners of a parallelogram, to thereby provide for a movement of the upper jaw portion 304 through a path generally normal to the pack-supporting flange 298 of the lower jaw portion 296. The described type of relative movement of the jaw portions avoids any damaging of the tissue sheets during the opening and closing of the jaws.

The movement of the upper jaw portion 304 with respect to the lower jaw is controlled by means including a cam follower arm 324, a cam 326, and a latch 328. The follower arm 324 (Fig. 12) is in the form of a bell crank which is pivotally mounted, at the intersection of its arm portions 330 and 332, on a cross pin 334 which is carried between the upper links 306. The free end of the arm 330 rotatably mounts a cam follower 336 in position for engagement with the cam 326 which is fixed to the jaw-supporting plate 284 in upwardly extending relation thereto. The follower arm portion 332 extends generally in the direction of the rotatable shaft 294 and has a follower 338 rotatably secured to its outer end in position for engagement with the shaft 294. A flat spring member 340 is secured at one of its ends to the link supporting pin 318, and this spring extends upwardly and forwardly to a position of pressing engagement with the upper surface of the arm 330 to thereby bias the cam follower 338 against the shaft 294.

The jaw portions 304 and 298 (Figs. 9, 12 and 13) are biased toward a closed position by means of a coil spring 342, which is disposed between the pin 334, carried between the upper links 306, and an underlying pin 344. The pin 334 extends through aligned openings in the lower portion of the webs 300 and is secured in position by a pair of nuts 346 on threaded outer end portions of the pins.

The latch mechanism 328, which is operable to hold the jaw portions 304 and 298 in an open position, includes a lever 348 pivotally mounted at one end on the rotatable shaft 294, a latch pin 350 on one of the lower links 308 in position for engagement with a notch 352 on the lever 348, and an actuating pin 354 pivotally mounted on a lower portion of the lever 348 and extending outwardly therefrom to a position overlying the pack-supporting surface of the lower jaw flange 298. The lever 348 is biased toward a position wherein the notch 352 engages the pin 350, by means including an elongated spring guide 356 extending through an opening (not shown) in the lower end of the lever and fixed to the pin 344. The spring guide 356 is formed with an enlarged outer end portion 358, and a coil spring 360 is interposed between the lever 348 and the seat provided by the end portion 358.

The actuating pin 354 is mounted at one end on a pivot pin 362 projecting laterally from the lever 348. The pin 354 extends through an opening (not shown) in the back of the lower jaw 296 and terminates in a circular head portion 364 disposed in closely overlying relation to the jaw flange 298.

As seen particularly in Fig. 12, the entry of the transfer plate structure 154 into the breaker jaw 92 establishes a contact between the transfer plate 158 and the actuating pin head 364, which moves the latter to the rear of the jaw. This movement is transferred to the lever 348 to swing the latter counterclockwise about the shaft 294, against the pressure of spring 360, and release the pin 350 from the notch 352. The larger coil spring 342 will then act on the upper links 306 to pull the upper jaw portion 304 downwardly into clamping engagement with the tissue pack, which is now primarily supported on a series of transverse ribs 366 (Fig. 10) extending upwardly from the flange 298 and between the cut away sections 162 in the transfer plate 158. The latter construction permits withdrawal of the transfer plate 158 while the jaw 92 firmly engages the pack of tissues.

As the upper jaw-supporting levers 306 and 308 move downwardly with the upper jaw 304, the pin 334 carried by the upper lever 306 and supporting the follower arm 324 also moves down to thereby cause the follower 338 to move upwardly on the shaft 294. This latter movement shifts the follower arm to the position indicated by broken lines in Fig. 12, wherein the roller 336 is disposed for timely engagement with the cam 326 to open the jaws and release the tissue packs in a manner to be later described.

As indicated above, the pack-supporting surface of the lower jaw 296 includes the transverse ribs 366 (Fig. 10) which permit movement of the pack transversely of the jaw but prevent longitudinal shifting of the pack in the jaw. Furthermore, these ribs 366 provide an elevated support, with respect to the flange 298, which permits withdrawal of the transfer plate 158 from the jaw without causing any undesired disturbance of the tissue pack. The pack engaging surface 370 of the upper jaw 304 is grooved longitudinally of the jaw (Fig. 11) to prevent any transverse shifting of the tissue pack, while permitting movement of the pack lengthwise in the jaw. The details of the function of the jaws will be more fully explained in connection with the description of the operation of the entire pack-separating machine.

The drive mechanism for the breaker jaws 92 includes the vertical shafts 280 which are rotatably mounted within the housings provided by the cylindrical members 102. The lower end of each of the shafts 280 has fixed thereto a laterally extending arm 372 (Figs. 4 and 5), which supports a depending roller 374 in position for engagement with a groove 376 formed in the surface of a cam 378 fixed to the cam shaft 176. The upper end of the shaft 280 has the jaw-supporting plates 282 and 284 fixed thereto for rotation with the shaft. The plate 284 has mounted thereon, between the vertical members 288 and 290 (Fig. 9), a bearing structure 380 which rotatably supports a vertical lay shaft 382. The lower end of the lay shaft 382 has fixed thereto a spur gear 384, which is disposed for engagement with a larger gear 386 nonrotatably fixed on the upper end of the member 102, as by the bolts 388.

The upper end of the shaft 280 carries a relatively fixed, bevel gear 390 in position for engagement with a bevel gear 392 which is fixed to the horizontal shaft 294 for rotation therewith. Thus it is seen that, as the shaft 176 (Fig. 5) rotates, the cam 378 effects a rotary motion of the vertical shaft 280 between the limits of an arc determined by the cam groove 376. The rotation of the shaft 280 moves the entire jaw supporting frame 286 (Fig. 9) about the axis of shaft 280, thereby effecting a rotation of the lay shaft 382 as the gear 384 moves around the fixed gear 386. This rotation of the shaft 280 is transmitted to the horizontal shaft 294, through the bevel gears 390 and 392, to provide for vertical swinging movement of the breaker jaw structure fixed to shaft 294.

It is seen, therefore, that the arrangement of the jaw structure and its drive mechanism affords both a horizontal and a vertical swinging movement of the jaws 92. Briefly, the horizontal movement of the jaws is through an angle of 90°, as illustrated by the two positions shown in Figs. 5 and 6. The vertical movement of the jaws 92 is through an angle of 180°, with the jaws being completely inverted during their travel from the pack-receiving position in Fig. 18 to the pack discharging position in Fig. 5.

Figure 3:
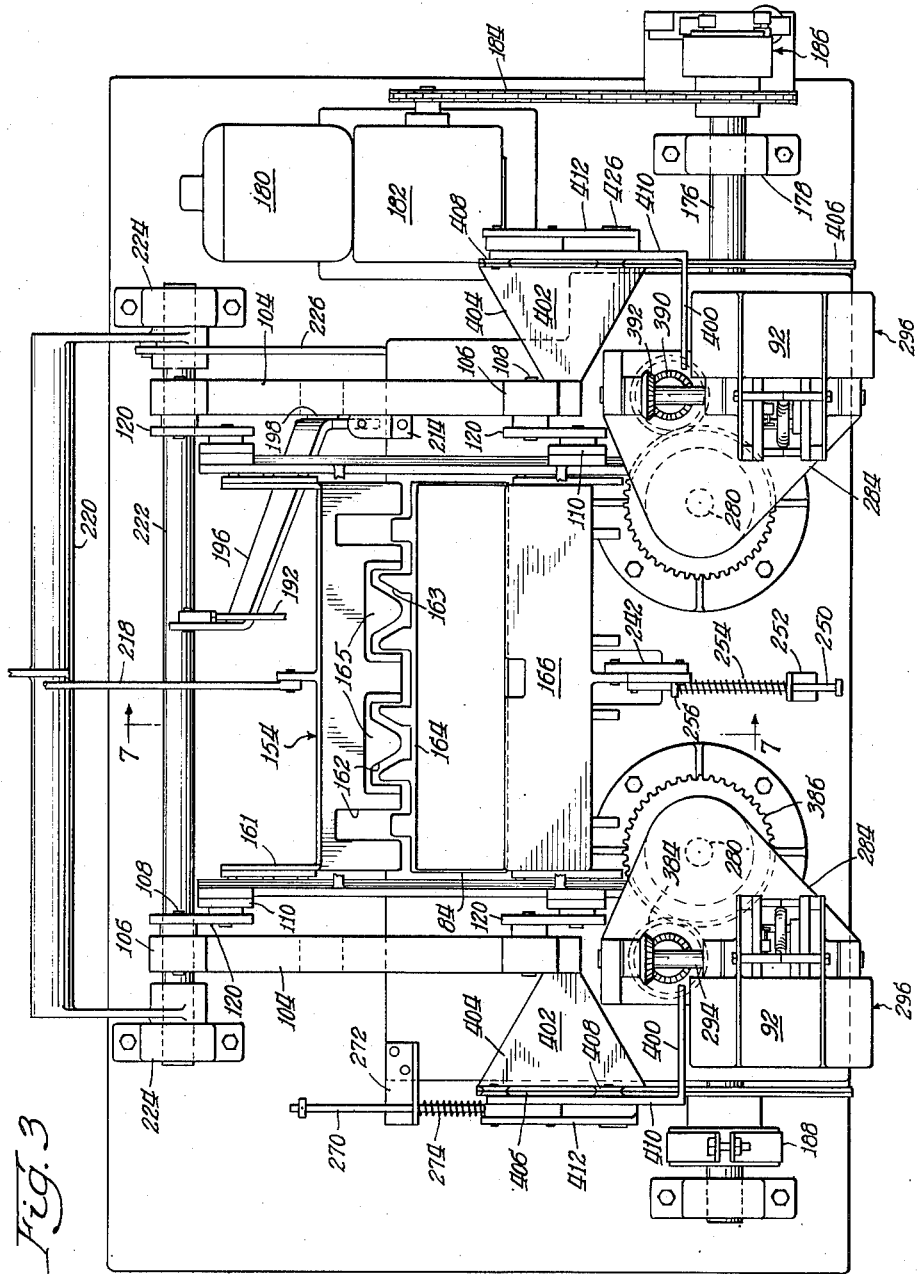
Fig. 3 is a plan view of the structure in Fig. 2.
Figure 4:
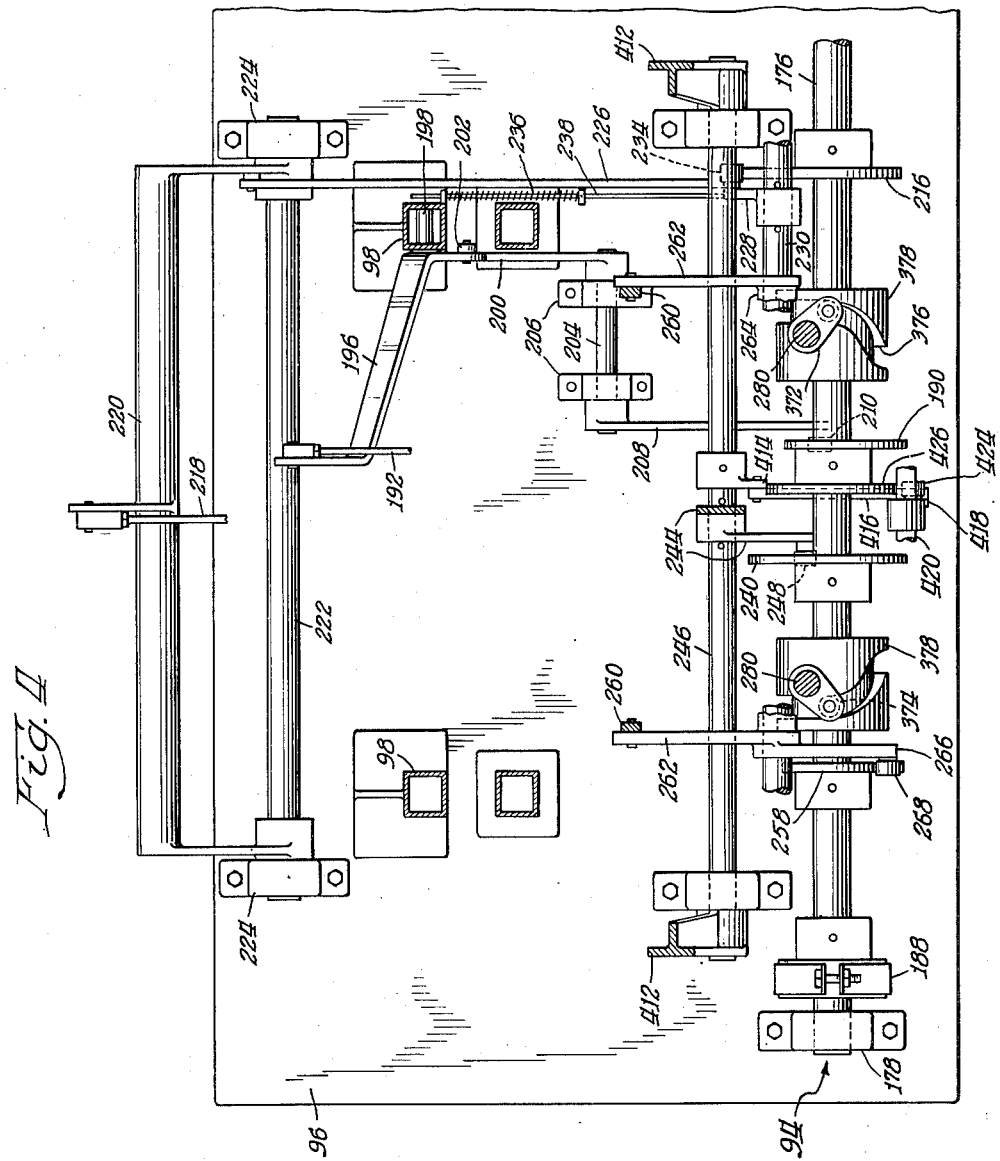
Fig. 4 is a sectional view taken generally along the line 4—4 in Fig. 2.

The pack separating mechanism also includes structure for effecting a removal of the tissue packs from the breaker jaws 92 after they have reached the limit position seen in Figs. 2, 3 and 5. The pack removal mechanism for each of the breaker jaws includes a pusher bar 400 which is movably supported on a frame structure 302 positioned alongside the side frame member 104 in laterally extending relation thereto. The supporting frame 402 includes a plate 404, which is suitably secured to the forward portion of the main frame member 104, having a strap member 406 (Fig. 2) along its outer edge in parallel relation to the main frame member 104. The strap 406 provides a track for a plurality of vertically spaced rollers 408, which are rotatably mounted on a vertically extending plate 410 fixed at right angles with the pusher bar 400 in rearwardly extending relation. Thus the pusher bar 400 is mounted for movement alongside the main frame member 104 through a path which extends between the upper and lower jaw members 304 and 296, respectively, when the breaker jaw has moved to the limit position seen in Fig. 5.

Controlled movement of the pusher bar associated with each of the breaker jaws 92 is provided by a vertically extending lever 412, which is pivotally connected at its upper end to the side plate 410 of the pusher bar. The lower end of the lever 412 is keyed to the shaft 246 disposed to the rear of the main cam shaft 176. Also, keyed to the shaft 246 is a depending arm 414 (Fig. 6) which is pivotally connected, as by the link 416, with the lower end of a lever 418. The lever 418 is pivotally mounted at its upper end on a stub shaft 420 which is supported on the underlying portion of the sub-frame 100 by a pair of bearing structures 422. An intermediate portion of the lever 418 includes a rotatable cam follower 424 in position for engagement with a cam 426 secured on the cam shaft 176.

The cam follower 424 is maintained in position against the cam 426 by means of a spring biased rod 270 (Fig. 2) which is pivotally connected to the lever 412 and extends rearwardly therefrom for sliding engagement with a bracket 272 on the frame 100. A spring 274 is disposed between the bracket 272 and a fixed seat 276 on the rod, to thereby urge the rod 270 forwardly. As a result, the lever 412 is biased for movement clockwise about the shaft 246, to thereby pull the link 416 to the left and hold the cam follower 424 against the cam 426.

Thus it is seen that rotation of the cam 426 will effect a swinging movement of the lever 418, which will effect a corresponding movement of the vertically extending levers 412 to move the pusher bars 400 longitudinally of the machine 86.

*Operation*

Having in mind the above described structure, an explanation will be given of the operation of the illustrated mechanism, with particular attention being given to the pack separating mechanism 86.

Looking first at Fig. 1, it is seen that as the pair of tissue webs 64 move into the interfolding machine 60 from a suitable source (not shown) they are incompletely slit longitudinally by the slitters 80 and transversely cut by the rotating knives 68, to thereby partially sever the web across the width and, also, to define the separable tissue sheets to be folded. The longitudinal slitting results in the line of easily breakable bonds 54 indicated in Fig. 23, and the transverse slitting produced the series of light bonds between the individual sheets, which is indicated by the numeral 36 in Fig. 26.

As the webs 64 travel downwardly, through the path defined by the guide rolls 62 and the anvil rolls 66, they enter the rotating interfolding rolls 70 and 72 where the webs are grasped by folding jaws on the rolls and alternately folded in opposite directions to form the stack 73 of folded tissue sheets. As the stack 73 is formed beneath the interfolding rolls, the packers 75 and the hold down fingers 78 cooperate to maintain the top of the stack in a predetermined position with respect to the interfolding rolls.

The marker sheets 44, which are cut from the roll 82 and delivered in folded form to the interfolding rolls by the mechanism indicated generally at 83, are grasped by the folding jaws on the rolls 70 and 72 and interfolded with the tissue webs 64 for disposition at predetermined intervals in the stack 73. The conveyor 76 moves the formed stack of folded tissue sheets through the chute 74 and out of the upper end of the vertical chute section 84 for further handling by the pack separating mechanism 86. In the illustrated mechanism the formation of the stack 73 is a continuous operation and, therefore, the portion of the stack in the chute section 84 is continuously moving upwardly.

The starting position of the pack separator is illustrated in Figs. 6, 7 and 14, wherein the transfer plate 154 is disposed in rearwardly adjacent relation to the lip 164 of the chute 74 (to the left in the figures), the pusher assembly 124 is disposed in position to engage the forward edge of the tissue stack, the separator plate 166 is withdrawn to a position forwardly (to the right) of the stack, and the breaker jaws 92 are in spaced, parallel relation at the side of the machine in position for discharging the separated portions of the double pack previously removed from the top of the stack 73.

As the stack in the chute 74 rises to a predetermined level, wherein the leading marker sheet 44 is approximately level with the lip 164, the upward pressure of the stack moves the spring 150 to close the switch 152 and thereby actuate the single revolution clutch 186 (Fig. 5). The operation of the clutch 186 effects a transmission of power from the motor 180 (Fig. 3) to the cam shaft 176. During the one revolution thereby provided for the cam shaft 176 all of the following described operations and movements are performed.

The cam 190 effects a downward movement of the follower 210, which movement is transferred through the arms 208 and 200 and the rod 202 to move the lever 196 rearwardly, and thus move the pusher assembly 124 across the upper portion of the stack 73. This rearward movement of the pusher 124 creates a generally lateral force on the adjacent edge of the leading pack "A" of tissues to move the latter to the rear of the machine to a position on the transfer plate 154. However, due to the weight of the leading pack "A" and the resistance of the flange 133 (Fig. 14) of the pusher elements 130 to the continued upward movement of the stack in the chute 74, there is also created a downward force on pack "A." Consequently, the resulting component of the lateral force exerted by the pushers 130 and the aforementioned downward force is in a direction to the left and inclined downwardly.

In the illustrated embodiment, the marker sheet 44 extends over approximately 40% of the area of the tissue pack. However, this relationship is not a particularly critical one in affording proper separation of the pack from the stack. It is to be expected that the best results will be achieved when the marker sheet extends over the entire area of the pack and, also, that the minimum size of marker sheet which will be effective in separation of the pack is dependent largely on the characteristics of the sheet material involved. However, when less than the entire area of the pack is covered by the marker sheet, it will generally be found desirable to restrain the continuously moving pack, as by the flange 133, in the area of the marker sheet, in order that the above mentioned resultant of forces on the leading pack passes through the pack at the position of the marker sheet. This is particularly true of sheet material such as facial tissues wherein a downward force on the sheets tends to lock them together. Consequently, if such a pack is restrained at portions thereof outside of the area of the marker sheet, the sheet-interlocking effect created thereby might be sufficient to prevent lateral movement of the pack or at least disrupt the pack during the separation operation.

The flange 133 of the pusher element 130 is also particularly effective with limp sheet material, such as tissues, in preventing the engaged edges of the pack from rolling toward the center of the pack. This restraining of the pack affords movement of the pack as a unit away from the stack and prevents any disarrangement of the orderly pack.

It is also important to note that the disclosed manner of separating a pack from a stack of tissues is not dependent upon a particular size of pack being delivered for its effectiveness. Even though there may be appreciable variations in the bulk of a predetermined number of sheets, the disclosed apparatus will operate to separate the individual packs at the plane of the marker sheets 44. The latter provides a plane of least resistance to the force exerted by the pusher 130 and, consequently, the separation will be at such plane even though the relative position of such plane may vary as the bulk of the tissues, or other sheet material, increases or decreases. One of the more important advantages afforded by this manner of operation is that it makes it possible to separate packs of sheet material at a much faster rate than was possible heretofore. Correspondingly, the interfolder can be operated at a greater rate of speed and thereby increase the production rate of the folded sheet material without being hampered by a relatively slow operating pack separating mechanism.

Furthermore, there is provided an adjustment for the pusher 124 and the switch control spring 150, through movement of the knob 148, to reposition these elements in the event that the bulk variation becomes excessive for passage of the separated pack over the chute lip 164 or if it is desired to separate packs containing a greater or lesser number of sheets. For example, the adjustment provided through knob 148 and the associated structure makes it possible to readily change from handling packs of 200 sheets to handling packs of 300 sheets. This latter feature of the present invention is of considerable importance in that it overcomes a common difficulty experienced in previous attempts to mechanically separate packs of sheet material subject to appreciable bulk variation.

This particular application of force described above is very effective in achieving a smooth separation between the leading pack of tissues and the remainder of the oncoming stack 73 at the plane of the marker sheet 44. Another important factor in the highly satisfactory separation achieved by the present invention is the utilization of a difference in surface characteristics of the sheet material being handled and the markers, as evidenced by the relatively smooth surface of the calendered sheets which are used for the marker sheets 44. The marker sheets offer considerably less frictional resistance than the creped tissue sheets and, consequently, there is required less force to effect relative movement between the marker sheet and the adjacent tissue sheet than is required to disrupt the stack. Consequently, the described separation is effected without disturbing the leading pack or the succeeding stack.

In the event that it is desirable to insert a reminder or advertising circular in each pack of tissues, for example, in the manner disclosed in the above mentioned Sabee et al. application, Serial No. 308,996, this may be readily done without interfering with the effective operation of the present structure in separating the packs at the plane of the marker sheets. In such instance it is only necessary to have the vertically extending flange of the pusher elements 130 of sufficient depth to extend downwardly beyond the position of the reminder sheet in the pack.

As seen in Fig. 15, the shaft 176 has rotated approximately 60° while the pusher assembly 124 has deposited the leading pack "A," on to the transfer plate 154. It will also be noted that the marker sheet 44 has moved with the pack, and the larger flap 48 of the marker sheet is disposed on the plate 158 behind the elevated edge portions 165 of the latter.

As the leading pack is being separated from the stack, the cam 426 is simultaneously effecting movement of the follower 424 to produce a pack discharge motion of the pusher bars 400 (Figs. 5 and 6). More particularly, the lever 418 (Fig. 6) is allowed to move rearwardly to rock the shaft 246 clockwise, through the link 416 and the arm 414, and thereby cause a forward swinging motion of the levers 412 about the axis of the shaft 246. This effects a sliding movement of the pusher bar supporting plate 410 along the track 406 and moves the pusher bar 400 forwardly between the upper end and lower jaw portions of the breaker jaws 92, thereby ejecting any packs which may be supported in the jaws.

During the described action of the pusher mechanism 124 and the pack removal pusher bars 400, the remainder of the machine is virtually stationary.

As the shaft 176 passes the position illustrated in Fig. 15, the cam 258, which controls the carriage 90, permits a downward movement of its follower 268 to thereby raise the carriage to the position in Fig. 16. The dropping off of the follower 268 causes a clockwise rotation of the arms 266 and 262 about the axis of the shaft 230, and an upward movement of the rods 260 to thereby elevate the carriage. At this point in the operation, with the shaft having moved through an angle of about 95°, the pusher assembly 124 and the transfer plate 154 are about to move to the right (Fig. 16), while the breaker jaws 92 and the pusher bars 400 remain in the position described with respect to Fig. 15.

However, it will be noted that the separator plate 166 has begun to move rearwardly across the stack as the follower 248 strikes a low point in the cam 240 and moves toward the shaft 176. This latter motion is effective to move the lever 244 counterclockwise about the shaft 246 and thus force the separator 166 rearwardly.

As the shaft 176 continues to rotate to a position of approximately 150° of its rotation (Fig. 17), the transfer plate 154 and the pusher assembly 124 move to the right, while the separator plate 166 moves to the left. The motion of the transfer plate is determined by the position of the cam 216 with respect to its follower 234. As the follower 234 moves toward the shaft 176, it effects a forward movement of the lever 228, link 226, the bifurcated lever 220, and the rod 218, the latter moving the transfer plate across the oncoming stack in elevated relation thereto.

The forward movement of the pusher 124 is accompanied by an upward movement of the pusher assembly as the rollers 122 strike the inclined portion of the track 138. This swings the pusher out of the way to prevent any possible interference with the action of the transfer plate 154 and the breaker jaws 92.

At the position in Fig. 17, the separator plate 166 is extended across the top of the stack with the spring 174 pressing against the stack. The relative movement of the transfer plate 154 has effected a separation of the lower tissue sheet in pack "A" from the stack 73 along the transverse bonded line 36a. Also, the jaws 92 have begun to swing inwardly toward each other, by movement of the rollers 374 into the curved section of the groove 376 in the cams 378, and the pusher bars 400 are moving rearwardly to a position away from the breaker jaws 92. The rotation of the jaws 92 is effected through the lateral motion of the followers 374 which is translated into rotary motion of the shaft 280 by the arms 372. A more detailed operation of the breaker jaws will be given later in the description. However, it should be noted that as the jaws 92 swing horizontally through a 90° arc to assume a pack-receiving position the jaws also rotate 180° about the axis of their supporting shaft 294.

As the shaft 176 continues to rotate and reaches a position of about 210° in its path of rotation, the jaws 92 (Fig. 18) are in their pack-receiving position and the transfer plate 154 has moved into the jaws to strike the pin 354 and thus cause the upper jaw portion 304 to move downwardly into engagement with the pack, as previously described. At this stage of operation, the pusher assembly 124 is at its uppermost position and the carriage 90 has moved downwardly to its lowermost position wherein the transfer plate 154 and the jaws 92 are properly aligned. The separator plate 166 has resumed its inoperative position forwardly of the stack, and the pusher bars 400 are in their inoperative position.

The jaws 92 having grasped the separated pack "A," the transfer plate 154 moves rearwardly to its original position and the pusher 124 moves downwardly and rearwardly toward its starting position (Fig. 14), as the jaws begin to move the double pack to divide the pack and move the separated portions to a pair of discharge positions along the forward side of the machine. During this last portion of the cycle of operation, the carriage 90 is elevated somewhat to provide for clearance of the oncoming stack of tissue, and then it is lowered to properly position the transfer plate 154 in the pack receiving position indicated in Fig. 14.

The detailed operation of the breaker jaws 92, during the cycle of operation just described, will be best understood with reference to Figs. 9–13, 20, 21 and 22. As the pack separating machine 86 reaches the point in its cycle of operation illustrated in Fig. 18, the transfer plate structure 154 enters the laterally aligned pair of breaker jaws to deposit the double pack of folded tissues therein. The leading edge of the transfer plate strikes the head portion 364 (Fig. 12) of the actuating pin 354, to thereby disengage the notch 352 from the pin 350 and allow the spring 342 to close the upper jaw portions 304.

Figure 19:
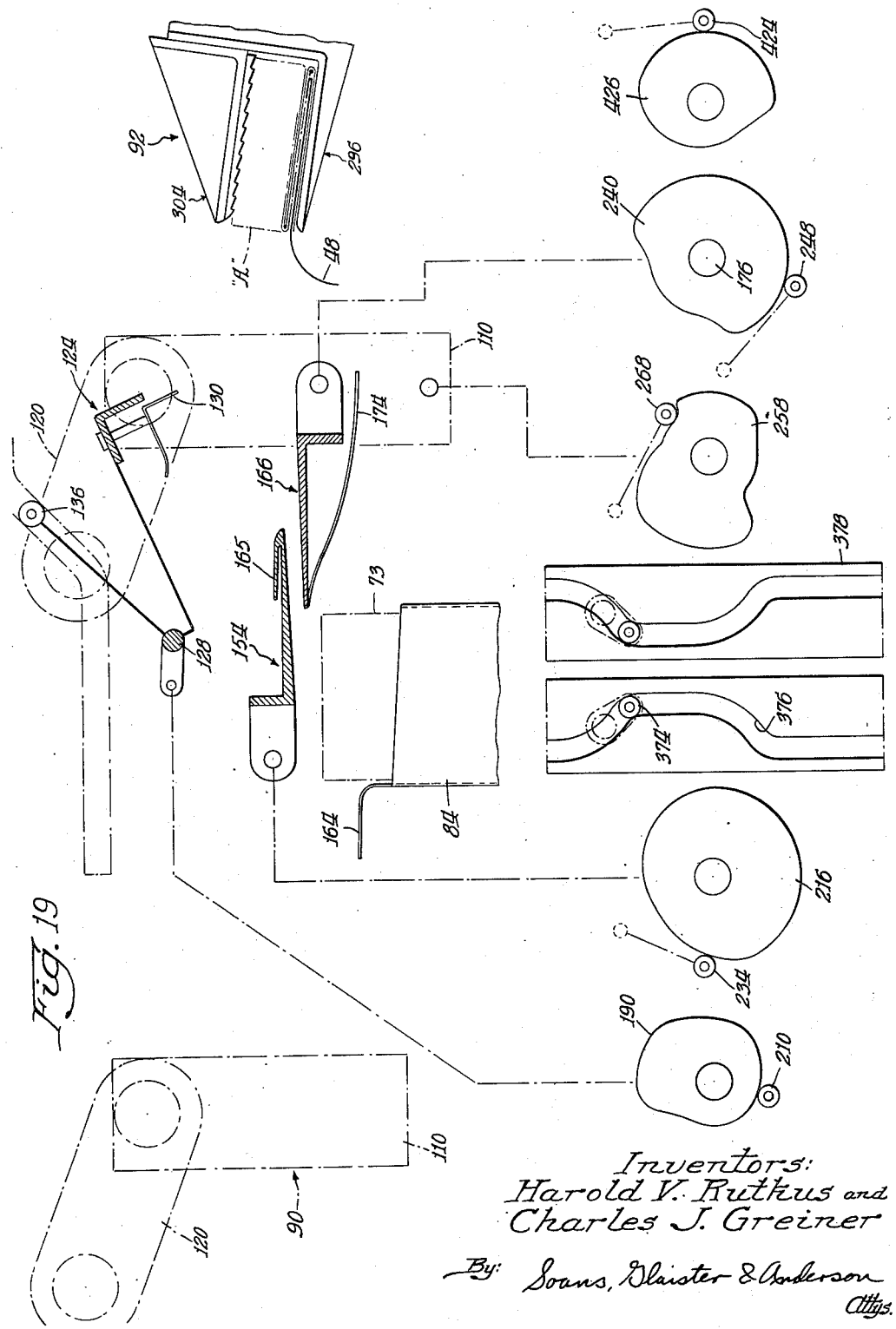

The double pack "A" is then held firmly between the upper jaw surface 370 and the ribs 366 on the lower jaw flange 298 and, to some extent, the transfer plate 158. The latter is then withdrawn, with the lower flap 48 of the marker sheet being grasped between the raised edge portions 165 of the transfer plate and the underlying plate 158 to unfold the flap 48, as seen in Fig. 19.

The breaker jaw cams 378 move into a path of rotation which results in rotary movement of the shafts 280, and the jaws 92 supported thereby, in opposite directions about the axis of the shafts. Also, the horizontal rotation of the breaker jaws effects a rotation of the vertical lay shafts 382, through the gears 384 and 386, to thereby vertically swing each of the jaws about the axis of the shaft 294. This combined horizontal and vertical rotation of the breaker jaws 92 simulates the manual motion of grasping the double pack and tearing it in two sections along the line of breakable bonds 54 (Fig. 20). In other words, the two sections of the double pack are torn along the line 54 from front to rear (right to left in Fig. 12) as the gripper jaws swing away from each other in an upwardly moving curved path.

The path of movement of the breaker jaws 92 is generally illustrated in Figs. 20, 21, and 22, wherein the relative changes in the horizontal and vertical positions of the jaws is shown schematically with respect to the corresponding position of the cams 378 and the followers 374. As noted in these figures, the total vertical movement of the jaws is approximately 180° while the jaws swing through a horizontal arc of about 90°.

More particularly, the initial pack engaging position of the jaws 92 is indicated by broken lines bearing the reference "a" in Fig. 20, wherein the jaws are disposed in laterally aligned positions and the corresponding relative position of the cam 378 and follower 374 is associated therewith by a broken line arrow. As the jaws 92 rotate about their respective shafts 280 and 294, the breaker jaws separate and pass through a pair of positions indicated in full at "b" in Fig. 20. Continued rotation of the jaws 92 places them in a vertical position with the jaws disposed at an angle with respect to each other, as seen at "c" in Fig. 21, and finally to the generally parallel positions "d" where the separated packs of sheets are disposed in position for discharge from the jaws by the pusher bars 400.

As the jaws 92 approach their pack discharging position at the side of the main frame 86 forwardly of the pusher bars 400 (Figs. 2, 3 and 5), the cam follower 336 on each of the jaws (Fig. 13) strikes the outer edge of the associated cam 326. In this respect, it should be noted from the above description of the breaker jaw structure that the follower arm 330 has moved away from the jaws, to the broken line position in Fig. 10, upon the tripping of the pin 354 by the transfer plate 154. And, as the follower 336 strikes the cam 326, the arm 324 is moved into a position of engagement between the follower 338 and the shaft 294, thereby moving the jaw portion 104 away from the jaw portion 296 and repositioning the pin 350 in the notch 352.

With the breaker jaws inverted, the surface 370 of the jaw portion 304 provides the support for the separated packs of folded tissues. After the jaws have reached their limit position, seen in Figs. 2, 3 and 5, the pusher bar 400 is actuated by the cam 426 to move forwardly between the upper and lower jaw portions and thereby discharge the pack on to a conveyor belt or the like (not shown). At the start of the discharge movement of the pusher bar 400, the remainder of the machine 86 is at the stage of operation illustrated schematically in Fig. 15, with the pusher bars moving back to their original position at the stage of operation shown in Fig. 17.

As indicated previously, the surface 370 is grooved along the length of the jaw to permit the sliding movement of the pack provided by the pusher bar 400. Moreover, as indicated in Fig. 19, the upper fold 48 of the marker sheet 44 is furled toward the jaw by the withdrawal of the transfer plate 154. Consequently, as the pack is moved out of the jaw by the pusher bar 400, the fold 48 assumes a position across the top of the pack. This places the fold 48 in the desired position (Fig. 24) for packaging, so that the free edge of the fold underlies the slot 32 (Fig. 25) in the box 30.

As shown in Figs. 14–16, the breaker jaws 92 remain at their pack discharging position during the initial portion of the pack separating cycle, and these jaws begin their return movement as the other parts of the machine are approximately in the positions indicated in Fig. 17. At this stage of operation, the cam 378 and cam follower 374 cooperate to again rotate the shafts 280 and 294, moving the jaws through the position indicated at "e" in Fig. 22, the position "c" in Fig. 21, and the position "b" in Fig. 20, until the pack-receiving position "a" (Fig. 20) is reached.

The described path of movement for the jaws 92 in separating the double pack of tissues and delivering the separate packs to spaced-apart positions is through a pair of non-planar, curved paths defined by the rotation of the shafts 280 and 294. This movement effects a separation of the bonded packs from front to rear, while simultaneously severing the bonds from top to bottom of the pack. Consequently, there is a relatively small number of bonds being broken at any given instant and a minimum force is therefore required for the separation. Correspondingly, a minimum of restraint is required for the pack as by the gripping force exerted by the jaws 92. In handling relatively fragile sheets, such as facial tissues, the latter feature is particularly important in that it eliminates the possibility of damage to the sheets during the separation of the bonded double pack.

It is seen, therefore, that the described apparatus provides for an automatic separation of packs of predetermined size from a stack of folded tissues, which is continuously moving along its longitudinal axis through a given path. Further, the apparatus provides for separation of a double pack of tissues and delivery thereof to a pair of fixed stations in readiness for packaging. Both of the foregoing functions are rapidly accomplished in connection with the insertion of the marker sheets in the stack, which provide a means for separation of the packs, and result in the disposition of the marker sheet for use as a pull-out or starter sheet without further manipulation of the separated packs.

The advantages afforded by this invention will be more readily appreciated when it is understood that the separation of relatively limp materials, such as facial tissues, was heretofore a manual operation. Consequently, the rate of packing was slow and it was necessary to either run the sheet producing machine at a slow rate or intermittently shut down the machine in order to allow sufficient time for the manual separation of the packs.

It should be noted that certain of the principles of the present invention are independent of the particular structure and the arrangement of parts disclosed herein. For example, the direction of movement of the illustrated separating mechanism makes it desirable to have the marker sheets 44 fed into the interfolding machine from the forward side, but obviously a reversal of such movement may make it advisable to insert the marker sheets from the back side of the interfolding machine. And, although the chute portion 84 is described as being generally vertical, this chute might well be inclined or horizontal without appreciably detracting from the effective separation of the individual packs from the stack of sheets in the chute. Moreover, while the described arrangement of the separating mechanism is particularly adapted to the illustrated mechanism for forming the stack of tissue sheets, the theory of separation of the packs at the plane of the marker sheets could be applied equally as well to other types of machines and other types of sheet material without departing from the principles of this invention. Then too, the invention has obvious utility apart from its use with a double, bonded pack of tissues and may, therefore, employ a single breaker jaw to advantage or, if desired, use no breaker jaw or employ other means for positioning the separated pack as desired.

It is seen, therefore, that the principles of the present invention may well be employed in various modifications of the suggested apparatus, and that other advantageous uses of such principles may be readily apparent to those skilled in the art.

We claim:

1. A method of separating packs of a predetermined number of tissue sheets from a stack of tissues, comprising the steps of inserting a marker sheet in the stack after each of said predetermined number of sheets to thereby define the separable packs, each marker sheet covering a substantial percentage of the area of the adjoining tissue sheets and having a surface offering less frictional resistance than the surface of the tissues, moving the stack along its longitudinal axis through a generally vertical path, and applying a moving force to one of the side edges of the leading pack of tissue sheets in a direction downwardly and inclined with respect to the axis of the stack, whereby the leading pack is laterally displaced with respect to the stack through relative movement between the marker sheet defining the leading pack and the adjacent tissue sheet.

2. A method of producing packs of a predetermined number of folded tissues from a continuous web of tissue, comprising the partial severance of the web transversely at spaced intervals to leave an easily breakable bond defining separable sheet portions, folding the web alternately in opposite directions to thereby form a continuous stack of the separable sheet portions, introducing marker sheets at predetermined intervals along the web of separable sheet portions for folding with the web in the formation of the stack to thereby define packs containing a predetermined number of the folded tissues between a pair of marker sheets, the marker sheets each having a relatively smooth surface offering less frictional resistance than the surfaces of the folded tissues, moving the stack along its longitudinal axis upwardly through a given path, applying a force on the leading pack in a direction downwardly and inclined with respect to the axis of movement of the leading portion of the stack, thereby laterally displacing the leading pack from the stack at the plane of the marker sheet defining the leading pack, and breaking the transverse bond joining the leading pack and the succeeding pack.

3. In a method of producing packs of a predetermined number of folded tissues from a continuous web of tissue, the steps comprising the partial severance of the web longitudinally to leave an easily breakable bond therebetween, the partial severance of the web transversely at spaced intervals to leave an easily breakable bond defining separable sheet portions, folding the web alternately in opposite directions to form a continuous stack of the separable folded tissues, introducing a pair of marker sheets at predetermined intervals along the web of separable sheet portions on opposite sides of said longitudinal line of severance for folding with the web in the formation of the stack, thereby to effect an interfolding of said web and said marker sheets to form a double stack of folded tissues with each pair of marker sheets defining a double pack therebetween, the marker sheets having a relatively smooth surface offering less frictional resistance than the surfaces of the folded tissues, moving the double stack of folded tissues upwardly through a generally vertical path, applying a force along one side of the leading double pack of tissues in a direction downward and inclined with respect to the axis of the stack, while restraining the adjacent portion of the pack against upward movement in the area of the marker sheet, whereby said leading double pack is displaced relative to said stack through the sliding action afforded by said applied force and the relatively low frictional resistance of the marker sheets which define the lower limit of the leading pack, grasping the displaced leading pack on opposite sides of the breakable bond separating the two sections of the pack, and moving the two sections in opposite directions through a pair of non-planar curved paths, to thereby separate the packs along the breakable bond and present them at laterally spaced stations.

4. In a method of producing packs of a predetermined number of folded tissues from a continuous web of tissue, the steps comprising the partial severance of the web longitudinally to leave an easily breakable bond therebetween, the partial severance of the web transversely at spaced intervals to leave an easily breakable bond defining separable sheet portions, folding the web alternately in opposite directions to form a continuous stack of the separable folded tissues, introducing a pair of marker sheets at predetermined intervals along the web of separable sheet portions on opposite sides of said longitudinal line of severance for folding with the web in the formation of the stack, thereby to effect an interfolding of said web and said marker sheets to form a double stack of folded tissues with each pair of marker sheets defining a double pack of separable folded tissues therebetween, the marker sheets having a relatively smooth surface offering less frictional resistance than the surfaces of the folded tissues, moving the double stack of folded tissues upwardly through a generally vertical path, applying a force along one side of the leading double pack of tissues in a direction downward and inclined with respect to the axis of the stack and adjacent the portions thereof including the pair of marker sheets, whereby the leading double pack is moved out of the path of movement of the stack through the sliding action afforded by said applied force and the relatively low frictional resistance of the marker sheets which define the lower limit of the leading pack, moving the separated pack back across the stack while restraining the movement of the latter to thereby break the transverse bond between the separated pack and the stack, grasping the displaced leading pack on opposite sides of the breakable bond separating the two sections of the pack, moving the two sections in opposite directions through a pair of non-planar curved paths, each extending through approximately 90° in a horizontal direction and 180° in a vertical direction, to thereby separate the packs along the breakable bond therebetween and present them at laterally spaced stations in an inverted position, and discharging the separated packs at said spaced stations.

5. Apparatus for separating packs of tissue sheets from a stack including marker sheets of relatively low frictional resistance which are disposed at predetermined intervals in the stack to thereby define the separable packs, comprising means for continuously moving the stack upwardly along its longitudinal axis through a predetermined path, means for engaging one edge portion of the leading pack of the moving stack, said edge-engaging means including an angle member adapted to engage the leading surface and one side of the leading pack, means for moving said edge-engaging means transversely of the direction of travel of the moving stack, whereby said angle member is effective to exert forces on the stack having a resultant component extending in a direction downward and inclined with respect to the axis of the stack to separate the leading pack from the stack at the plane of least resistance defined by the leading one of the marker sheets.

6. Apparatus for separating packs of separably bonded, folded tissues from a stack of such tissues including marker sheets interposed between the folded separable tissues at predetermined intervals in the stack comprising, means for continuously moving the stack upwardly through a generally vertical path, means adjacent the path of movement of the stack which is movable transversely thereof to engage a side edge of the leading portion of the stack, said stack-engaging means including a part disposed to resist the continued movement of the upper end of the stack while said means is moving across the stack to remove the leading pack portion defined by the leading one of the marker sheets in the stack, a transfer plate movably positioned adjacent the stack in position for receiving the separated pack, a separator plate movable across the path of the stack between the separated pack and the remaining stack to break the bond between the bottom sheet of the separated pack and the top sheet of the remaining stack, a pack-transporting means adapted to receive the separated pack carried by said transfer plate and move it to a predetermined position, and drive means operatively connected with said stack-engaging means, transfer plate, separator plate, and pack-transporting means for effecting timed, relative movement thereof, whereby the operation of said drive means causes said stack engaging means to move into engagement with the leading portion of the stack and move same on to said transfer plate, and to move said transfer plate with said pack into engagement with said pack-transporting means while said separator plate severs the bond between the leading pack and the stack.

7. Apparatus for separating packs of separably bonded, folded tissues from a stack of such tissues including marker sheets of relatively low frictional resistance interposed at predetermined intervals between the separable folded tissues in the stack comprising, means for continuously moving the stack upwardly through a generally vertical path, means adjacent the path of movement of the stack which is movable transversely thereof to engage a transverse edge of the leading portion of the stack, said stack-engaging means including a part disposed to resist the continued movement of the upper end of the stack while said means is moving across the stack, whereby the stack is restrained in a plane generally parallel to the plane of the marker sheet to thereby effect a lateral movement of the leading pack as a unit at the plane of the marker sheet defining said pack, a transfer plate movably positioned adjacent the path of the stack in position for receiving the separated pack, a separator plate adjacent the path of the stack and movable thereacross in following relation to the stack-engaging means between the separated pack and the remaining stack to break the bond between the bottom sheet of the separated pack and the top sheet of the remaining stack, a pack-transporting means for receiving the separated pack from said transfer plate to move it to a predetermined position, drive means operatively interconnected with said stack-engaging means, transfer plate, separator plate, and pack-transporting means for effecting timed, relative movement thereof, and control means for said drive means comprising an element disposed in the path of movement of said stack and responsive to the movement of said stack to actuate said drive means, whereby actuation of said drive means by said control means causes said stack-engaging means to move into engagement with the leading portion of the stack and move the leading pack on to said transfer plate, whereupon said transfer plate conveys the separated pack to a position of supported engagement with said pack-transporting means while said separator plate severs the separable bond between the leading pack and the stack, and said pack-transporting means then moves said separated pack to said predetermined position.

8. In apparatus for separating packs of sheet material from a stack including marker sheets having a relatively low frictional resistance as compared with the sheet material, the marker sheets being inserted at predetermined intervals in the stack to thereby define the separable packs, means defining a fixed path of movement for the stack, means for moving said stack along its longitudinal axis through said path, means for engaging one side portion of the leading pack of tissues defined by one of the marker sheets, said pack-engaging means being movable transversely of the direction of travel of the leading pack to displace the latter relative to the stack at the plane of said one marker sheet, a gripper element disposed for engagement with the separated pack, and means for moving said gripper element through a non-planar curved path to thereby deposit the separated pack in inverted relation at a position spaced from the stack.

9. Apparatus for separating packs of tissue sheets from a stack including marker sheets of relatively low frictional resistance inserted at predetermined intervals in the stack to thereby define the separable packs comprising, means defining a fixed path of movement for the stack along its longitudinal axis, a pusher element movable transversely of said path to engage the leading pack and move it in a direction generally parallel to the plane of the marker sheet separating the leading pack from the succeeding stack, a gripper element disposed for engagement with said separated pack, and means mounting said gripper element for pivotal movement through a non-planar curved path extending through approximately 90° horizontally and 180° vertically, whereby said gripper element may deposit said pack in inverted relation at a position spaced from said stack.

10. In apparatus for separating double packs of tissue sheets from a stack wherein each double pack is divided by a transverse center line defined by a breakable bond formed between adjoining tissues and wherein each double pack is defined by a relatively narrow marker sheet having less frictional resistance than the tissue sheets, the improvement comprising means for directing the stack of tissues along its longitudinal axis through a predetermined path, a pusher element dispoed alongside of said path and movable into engagement with a portion of the leading pack adjacent the position of the marker sheets defining said pack, means for moving said pusher element across said stack to thereby exert a lateral force on said leading pack in a direction generally opposite the direction of movement of the stack and in inclined relation thereto, to thereby move the leading pack in a direction generally parallel to the plane of said one pair of marker sheets, a pair of jaw elements disposed to receive the displaced leading pack for supporting engagement therewith on either side of said transverse center line, and means for moving said jaw elements relative to each other through a non-planar curved path, to thereby separate said pack along said transverse center line and deposit the separated pack portions in predetermined positions.

11. Apparatus for separating packs of tissues from a stack including marker sheets interposed at predetermined intervals in the stack to define each pack portion comprising, means for directing said stack through a predetermined path including a portion of the path wherein said stack moves upwardly, a generally horizontal transfer plate adjacent the upper end of said path of movement of the stack, a pusher element positioned for movement transversely of said vertical path portion in the direction of said transfer plate, whereby said pusher element can engage a side portion of the leading pack of said stack and move it onto said transfer plate, a pair of carrier members disposed for movement relative to a position adjacent said transfer plate, said carrier members including relatively movable upper and lower jaw members which are operable to supportingly receive the separated pack at spaced positions therealong, means for moving said carriers in opposite directions through a non-planar curved path to thereby divide the pack transversely of its length and deposit the divided sections at laterally spaced positions with the sections inverted with respect to their original position in the stack.

12. In apparatus for producing packs of a predetermined quantity of folded tissues from a continuous web of tissue including means for partially severing the web transversely at spaced intervals to thereby define separable sheet portions, a folding mechanism for forming a continuous stack of separable folded tissue sheets from the web, and means for inserting a marker sheet into the folding mechanism at selected intervals, to thereby effect an interfolding of the web and marker sheet and form a stack of folded tissues with the marker sheet folded and positioned to define a separable pack of a predetermined number of folded tissues, said marker sheet having a folded edge portion disposed between adjoining folded edges of a pair of the tissue sheets with a flap portion of the marker sheet extending within the stack in underlying relation to the main part of the marker sheet, the improvement comprising a pack engaging means disposed along said path for movement transversely thereof, said pack engaging means being operable to engage a portion of the leading pack of the stack of tissues on the side thereof opposite the folded edge of the marker sheet defining the leading pack, to thereby effect relative movement between said pack and stack along the plane of the marker sheet with the latter moving with said pack and comprising the bottom sheet thereof, a pack transfer means disposed opposite said pack engaging means along said path in position to receive the separated pack, said pack transfer means including a raised portion along the edge thereof adjacent said stack path, means for moving said pack transfer means relative to its position along the path of movement of the stack, and a pack transporting means disposed for movement relative to a position in the path of movement of said pack transfer means, said pack transporting means including means for receiving said pack transfer means and for retaining the separated pack supported thereon during the withdrawal of said transfer means, whereby said raised edge portion of said transfer means engages the flap portion of the marker sheet and moves it to an outwardly extended position with respect to the pack on said pack supporting means.

13. A method of separating packs of predetermined size from a stack of sheet material, comprising the steps of inserting marker sheets in the stack at predetermined intervals to thereby define the packs of predetermined size, the marker sheets having surface friction characteristics differing from those of the sheet material being separated, moving the stack generally upwardly along its longitudinal axis through a given path, and applying a force to the leading pack in a direction downward and inclined with respect to the axis of movement of the leading portion of the stack, whereby the leading pack is separated from the stack along the plane of the marker sheet disposed between the leading pack and the remainder of the stack and moved in a direction generally normal to the direction of movement of the stack.

14. Apparatus for separating packs of sheet material from a stack including marker sheets disposed at predetermined intervals in the stack to thereby define the separable packs, the marker sheets having surface friction characteristics different from those of the sheet material, comprising means for moving the stack along its longitudinal axis through a generally vertical path, means for engaging a side and top portion of the leading pack of the stack and applying forces thereon having a resultant extending in a direction downward and inclined with respect to the axis of the stack, whereby the leading pack is laterally displaced relative to the stack through relative movement therebetween at the plane of the marker sheet defining the leading pack.

15. Apparatus for separating packs of tissue sheets from a stack thereof comprising, means defining a predetermined path of movement for the stack to move upwardly along its longitudinal axis, means for continuously moving the stack through said path, means disposed adjacent the path of movement of the stack and movable transversely of the path to engage a side edge portion of the stack, said stack-engaging means including a part thereof disposed to resist the continued upward movement of the stack while said means is moving across the stack to thereby produce a resultant force on the leading portion of the stack which is directed downward and in inclined relation to the axis of the stack, drive means operatively connected with said stack-engaging means for moving said stack-engaging means across the stack, and a control element operatively connected with said drive means which is disposed in the path of upward movement of the stack for actuation of said drive means in response to the pressure exerted on said control element by the stack as the latter moves through said path.

References Cited in the file of this patent

UNITED STATES PATENTS

| | | |
|---|---|---|
| 1,246,592 | Harvey | Nov. 13, 1917 |
| 1,266,218 | Currie et al. | May 14, 1918 |
| 1,344,034 | Hart | June 22, 1920 |
| 2,668,053 | Bach | Feb. 2, 1954 |
| 2,675,747 | Greiner et al. | Apr. 20, 1954 |

FOREIGN PATENTS

| | | |
|---|---|---|
| 372,031 | Germany | Mar. 23, 1923 |